United States Patent
Montemurro et al.

(10) Patent No.: US 10,356,662 B2
(45) Date of Patent: **\*Jul. 16, 2019**

(54) NEGOTIATION OF QUALITY OF SERVICE (QOS) INFORMATION FOR NETWORK MANAGEMENT TRAFFIC IN A WIRELESS LOCAL AREA NETWORK (WLAN)

(71) Applicant: BlackBerry Limited, Waterloo (CA)

(72) Inventors: Michael Peter Montemurro, Toronto (CA); Stephen McCann, Southampton (GB)

(73) Assignee: BlackBerry Limited, Waterloo, Ontario (CA)

( * ) Notice: Subject to any disclaimer, the term of this patent is extended or adjusted under 35 U.S.C. 154(b) by 154 days.

This patent is subject to a terminal disclaimer.

(21) Appl. No.: 15/460,991

(22) Filed: Mar. 16, 2017

(65) Prior Publication Data

US 2017/0188268 A1 Jun. 29, 2017

Related U.S. Application Data

(63) Continuation of application No. 13/045,658, filed on Mar. 11, 2011, now Pat. No. 9,615,383.

(30) Foreign Application Priority Data

Mar. 15, 2010 (CA) ..................... 2696037

(51) Int. Cl.
*H04W 28/24* (2009.01)
*H04W 74/00* (2009.01)
*H04W 84/12* (2009.01)

(52) U.S. Cl.
CPC ......... *H04W 28/24* (2013.01); *H04W 74/006* (2013.01); *H04W 84/12* (2013.01)

(58) Field of Classification Search
CPC .... H04W 74/006; H04W 84/12; H04W 28/24
See application file for complete search history.

(56) References Cited

U.S. PATENT DOCUMENTS 6,493,561 B1 12/2002 Hasegawa
7,010,305 B2 3/2006 Immonen et al.
(Continued)

FOREIGN PATENT DOCUMENTS

| CN | 1893396 A | 1/2007 |
|---|---|---|
| CN | 1969529 A | 5/2007 |

(Continued)

OTHER PUBLICATIONS

Advisory Action dated Jan. 20, 2016; U.S. Appl. No. 13/547,880, filed Jul. 12, 2012; 4 pages.
(Continued)

*Primary Examiner* — Abdullahi E Salad
(74) *Attorney, Agent, or Firm* — Conley Rose P.C.; J. Robert Brown, Jr.; Albert A. Abbou

(57) ABSTRACT

An access point advertises a management frame quality of service (MFQ) policy that defines an access category used for transmitting a first type of management frame. Each mobile station associated with the access point is to prioritize transmission of management frames according to the MFQ policy advertised by the access point, unless a policy configuration request for the mobile station to prioritize transmission of management frames according to a different MFQ policy has been accepted.

20 Claims, 10 Drawing Sheets

(56) References Cited

U.S. PATENT DOCUMENTS

| | | |
|---|---|---|
| 7,065,645 B2 | 6/2006 | Teicher |
| 7,151,764 B1 | 12/2006 | Heinonen et al. |
| 7,187,691 B2 | 3/2007 | Gavette |
| 7,277,932 B2 | 10/2007 | Adachi et al. |
| 7,376,097 B2 | 5/2008 | Yegin |
| 7,606,209 B2 | 10/2009 | Watanabe |
| 7,683,773 B1 | 3/2010 | Goodall et al. |
| 7,684,333 B1 | 3/2010 | Dasylva et al. |
| 8,170,481 B2 | 5/2012 | Rangarajan et al. |
| 8,274,908 B2 | 9/2012 | Hsin et al. |
| 8,374,122 B2 | 2/2013 | Meier et al. |
| 8,442,024 B2 | 5/2013 | Montemurro et al. |
| 8,458,279 B2 | 6/2013 | Montemurro et al. |
| 8,463,175 B2 | 6/2013 | Bajko |
| 8,514,807 B2 | 8/2013 | Kim et al. |
| 8,594,064 B2 | 11/2013 | Kaushik et al. |
| 8,681,769 B2 | 3/2014 | Montemurro et al. |
| 8,750,180 B2 | 6/2014 | McCann et al. |
| 8,775,533 B2 | 7/2014 | Hassan et al. |
| 8,792,489 B2 | 7/2014 | Anantharam et al. |
| 8,879,455 B1* | 11/2014 | Stephenson ........... H04H 20/423 370/312 |
| 8,897,788 B2 | 11/2014 | Ruuska |
| 8,929,346 B2 | 1/2015 | Montemurro et al. |
| 8,942,221 B2 | 1/2015 | McCann et al. |
| 9,137,621 B2 | 9/2015 | McCann et al. |
| 9,204,299 B2 | 12/2015 | McCann et al. |
| 9,301,127 B2 | 3/2016 | McCann et al. |
| 9,615,383 B2 | 4/2017 | Montemurro et al. |
| 9,622,155 B2 | 4/2017 | McCann et al. |
| 2002/0086675 A1 | 7/2002 | Mansour |
| 2002/0141369 A1 | 10/2002 | Perras |
| 2002/0159418 A1 | 10/2002 | Rudnick et al. |
| 2002/0169883 A1 | 11/2002 | Bright et al. |
| 2003/0103521 A1 | 6/2003 | Raphaeli et al. |
| 2003/0117984 A1 | 6/2003 | Gavette |
| 2003/0134636 A1 | 7/2003 | Sundar et al. |
| 2003/0217168 A1 | 11/2003 | Adachi et al. |
| 2004/0014422 A1 | 1/2004 | Kallio |
| 2004/0090958 A1 | 5/2004 | Park et al. |
| 2004/0199661 A1 | 10/2004 | Murdock |
| 2005/0060319 A1 | 3/2005 | Douglas |
| 2005/0097362 A1 | 5/2005 | Winget et al. |
| 2005/0111419 A1 | 5/2005 | Kwon et al. |
| 2005/0210523 A1 | 9/2005 | Parnell et al. |
| 2005/0286456 A1 | 12/2005 | McNew et al. |
| 2006/0067526 A1 | 3/2006 | Faccin et al. |
| 2006/0109113 A1 | 5/2006 | Reyes et al. |
| 2006/0114928 A1 | 6/2006 | Utsunomiya et al. |
| 2006/0142034 A1 | 6/2006 | Wentink et al. |
| 2006/0153230 A1 | 7/2006 | Miyata et al. |
| 2006/0221901 A1 | 10/2006 | Yaqub et al. |
| 2006/0245373 A1 | 11/2006 | Bajic |
| 2006/0264245 A1 | 11/2006 | Luo |
| 2007/0025297 A1 | 2/2007 | Lee et al. |
| 2007/0041344 A1 | 2/2007 | Yaqub et al. |
| 2007/0064655 A1 | 3/2007 | Ruuska |
| 2007/0064660 A1 | 3/2007 | Qi et al. |
| 2007/0086359 A1 | 4/2007 | Yaqub |
| 2007/0110018 A1 | 5/2007 | Delaney et al. |
| 2007/0110092 A1 | 5/2007 | Kangude et al. |
| 2007/0124592 A1 | 5/2007 | Oyama |
| 2007/0153732 A1 | 7/2007 | Yao |
| 2007/0230389 A1* | 10/2007 | Amann ............. H04W 72/1242 370/314 |
| 2007/0230423 A1* | 10/2007 | Yoshida ................ H04W 76/10 370/338 |
| 2007/0243888 A1 | 10/2007 | Faccin |
| 2007/0297438 A1 | 12/2007 | Meylan et al. |
| 2008/0031212 A1* | 2/2008 | Ogura .................. H04W 28/16 370/338 |
| 2008/0049761 A1* | 2/2008 | Lin ........................ H04L 12/66 370/395.21 |
| 2008/0057992 A1 | 3/2008 | Griffin |
| 2008/0095048 A1 | 4/2008 | Zhong |
| 2008/0096580 A1 | 4/2008 | Montemurro |
| 2008/0114857 A1 | 5/2008 | Snider |
| 2008/0123607 A1 | 5/2008 | Jokela |
| 2008/0141031 A1 | 6/2008 | Oba et al. |
| 2008/0151796 A1 | 6/2008 | Jokela |
| 2008/0178277 A1 | 7/2008 | Oba et al. |
| 2008/0186962 A1 | 8/2008 | Sinha |
| 2008/0261574 A1 | 10/2008 | Rinta-Aho et al. |
| 2008/0270534 A1 | 10/2008 | Xia et al. |
| 2008/0298333 A1 | 12/2008 | Seok |
| 2009/0010399 A1 | 1/2009 | Kim et al. |
| 2009/0031138 A1 | 1/2009 | Nakhjiri |
| 2009/0046657 A1 | 2/2009 | Kim et al. |
| 2009/0047922 A1 | 2/2009 | Buckley et al. |
| 2009/0047974 A1 | 2/2009 | Quinn |
| 2009/0067326 A1 | 3/2009 | Perrot et al. |
| 2009/0067397 A1* | 3/2009 | Seok ..................... H04L 41/00 370/338 |
| 2009/0116647 A1 | 5/2009 | Korus et al. |
| 2009/0156213 A1 | 6/2009 | Spinelli et al. |
| 2009/0177759 A1 | 7/2009 | Ogawa et al. |
| 2009/0245184 A1 | 10/2009 | Torres et al. |
| 2009/0247111 A1 | 10/2009 | Sennett et al. |
| 2009/0252165 A1 | 10/2009 | Zhang et al. |
| 2009/0296688 A1 | 12/2009 | Bakker et al. |
| 2009/0296689 A1 | 12/2009 | Bakker et al. |
| 2009/0298458 A1 | 12/2009 | Bakker et al. |
| 2009/0310692 A1 | 12/2009 | Kafle et al. |
| 2009/0325566 A1 | 12/2009 | Bell et al. |
| 2010/0118831 A1 | 5/2010 | Chen et al. |
| 2010/0146272 A1 | 6/2010 | Centonza et al. |
| 2010/0169953 A1 | 7/2010 | Hofer et al. |
| 2010/0216434 A1 | 8/2010 | Marcellino et al. |
| 2010/0255864 A1 | 10/2010 | Alfano et al. |
| 2010/0271978 A1 | 10/2010 | Gupta et al. |
| 2010/0275249 A1 | 10/2010 | McCann et al. |
| 2010/0279684 A1 | 11/2010 | Salkintzis |
| 2010/0293293 A1 | 11/2010 | Beser |
| 2010/0325714 A1 | 12/2010 | Iyer et al. |
| 2011/0028093 A1 | 2/2011 | Patel et al. |
| 2011/0040969 A1 | 2/2011 | Yao et al. |
| 2011/0047382 A1 | 2/2011 | Wang et al. |
| 2011/0055218 A1 | 3/2011 | Capuozzo et al. |
| 2011/0072101 A1 | 3/2011 | Forssell et al. |
| 2011/0103232 A1 | 5/2011 | Sood |
| 2011/0113252 A1 | 5/2011 | Krischer et al. |
| 2011/0149806 A1 | 6/2011 | Verma et al. |
| 2011/0149938 A1 | 6/2011 | Bajko |
| 2011/0154018 A1 | 6/2011 | Edstrom et al. |
| 2011/0162060 A1 | 6/2011 | Vijayakumar et al. |
| 2011/0216743 A1 | 6/2011 | Bachmann et al. |
| 2011/0188391 A1 | 8/2011 | Sella et al. |
| 2011/0274082 A1 | 11/2011 | Calhoun et al. |
| 2011/0280227 A1 | 11/2011 | McCann et al. |
| 2011/0286405 A1 | 11/2011 | Kim et al. |
| 2012/0008605 A2 | 1/2012 | Montemurro et al. |
| 2012/0017267 A1 | 1/2012 | McCann et al. |
| 2012/0054106 A1 | 3/2012 | Stephenson et al. |
| 2012/0057568 A1 | 3/2012 | Lim et al. |
| 2012/0076117 A1 | 3/2012 | Montemurro et al. |
| 2012/0076118 A1 | 3/2012 | Montemurro et al. |
| 2012/0106514 A1 | 5/2012 | Zheng et al. |
| 2012/0116886 A1 | 5/2012 | Manku |
| 2012/0134349 A1 | 5/2012 | Jung et al. |
| 2012/0165056 A1 | 6/2012 | Kim et al. |
| 2012/0182970 A1 | 7/2012 | Ding et al. |
| 2012/0239755 A1 | 9/2012 | Filgueiras et al. |
| 2012/0243524 A1 | 9/2012 | Verma et al. |
| 2012/0244902 A1 | 9/2012 | Saito et al. |
| 2012/0246468 A1 | 9/2012 | Gabor |
| 2012/0281609 A1 | 11/2012 | Kasslin et al. |
| 2012/0296986 A1 | 11/2012 | Hassan et al. |
| 2013/0012260 A1 | 1/2013 | Salkintzis et al. |
| 2013/0028245 A1 | 1/2013 | Oerton et al. |
| 2013/0034023 A1 | 2/2013 | Jung |
| 2013/0039275 A1 | 2/2013 | Patil et al. |
| 2013/0051303 A1 | 2/2013 | Huang et al. |
| 2013/0064175 A1 | 3/2013 | Pandey et al. |

(56) References Cited

U.S. PATENT DOCUMENTS

| | | |
|---|---|---|
| 2013/0065627 A1 | 3/2013 | Jung et al. |
| 2013/0065633 A1 | 3/2013 | Sridhara et al. |
| 2013/0066936 A1 | 3/2013 | Krishnan et al. |
| 2013/0070738 A1 | 3/2013 | McCann et al. |
| 2013/0070739 A1 | 3/2013 | McCann et al. |
| 2013/0072248 A1 | 3/2013 | Bajko |
| 2013/0148643 A1 | 6/2013 | Abraham et al. |
| 2013/0166759 A1 | 6/2013 | Rajamani et al. |
| 2013/0170351 A1 | 7/2013 | Reznik et al. |
| 2013/0176897 A1 | 7/2013 | Wang et al. |
| 2013/0177002 A1 | 7/2013 | Sun et al. |
| 2013/0208582 A1 | 8/2013 | Wijnands et al. |
| 2013/0227152 A1 | 8/2013 | Lee et al. |
| 2013/0231151 A1 | 9/2013 | Kneckt et al. |
| 2013/0259034 A1 | 10/2013 | Klein et al. |
| 2013/0259038 A1 | 10/2013 | Anantharam et al. |
| 2013/0259040 A1 | 10/2013 | Anantharam et al. |
| 2013/0262850 A1 | 10/2013 | Canpolat et al. |
| 2013/0276076 A1 | 10/2013 | Gupta et al. |
| 2013/0281056 A1 | 10/2013 | Abraham et al. |
| 2013/0282793 A1 | 10/2013 | Swings et al. |
| 2013/0316705 A1 | 11/2013 | Kneckt et al. |
| 2013/0339478 A1 | 12/2013 | Edge et al. |
| 2014/0016612 A1 | 1/2014 | McCann et al. |
| 2014/0018037 A1 | 1/2014 | Shanmugavadivel et al. |
| 2014/0050167 A1 | 2/2014 | Smedman et al. |
| 2014/0073356 A1 | 3/2014 | Siomina et al. |
| 2014/0078935 A1 | 3/2014 | Sun |
| 2014/0086134 A1 | 3/2014 | Smadi et al. |
| 2014/0091987 A1 | 4/2014 | Lee et al. |
| 2014/0101441 A1 | 4/2014 | Edstrom et al. |
| 2014/0164763 A1 | 6/2014 | Cherian et al. |
| 2014/0242985 A1 | 8/2014 | Kneckt et al. |
| 2014/0286242 A1 | 9/2014 | McCann et al. |
| 2014/0293978 A1 | 10/2014 | Yang et al. |
| 2015/0131641 A1 | 5/2015 | Ong et al. |
| 2015/0248702 A1 | 9/2015 | Chatterton |
| 2015/0373765 A1 | 12/2015 | Lee et al. |
| 2016/0080989 A1 | 3/2016 | McCann et al. |
| 2016/0173586 A1 | 6/2016 | McCann et al. |
| 2017/0318018 A1 | 11/2017 | Huang et al. |

FOREIGN PATENT DOCUMENTS

| | | |
|---|---|---|
| CN | 101141259 A | 3/2008 |
| CN | 101142788 A | 3/2008 |
| CN | 101150442 A | 3/2008 |
| CN | 101317384 A | 12/2008 |
| CN | 101379801 A | 3/2009 |
| CN | 101395949 A | 3/2009 |
| CN | 101583151 A | 11/2009 |
| CN | 101682539 A | 3/2010 |
| EP | 1919154 A1 | 5/2008 |
| EP | 1921818 A2 | 5/2008 |
| EP | 2076090 A1 | 7/2009 |
| EP | 2093967 A2 | 8/2009 |
| EP | 2445242 A1 | 4/2012 |
| EP | 2661122 A2 | 11/2013 |
| JP | 2002314546 A | 10/2002 |
| JP | 2004186753 A | 7/2004 |
| JP | 2008537657 A | 9/2008 |
| JP | 2008544588 A | 12/2008 |
| TW | 200947966 A1 | 11/2009 |
| WO | 0245456 A1 | 6/2002 |
| WO | 03092218 A1 | 11/2003 |
| WO | 2007082007 A2 | 7/2007 |
| WO | 2007083824 A1 | 7/2007 |
| WO | 2007103055 A2 | 9/2007 |
| WO | 2007116337 A2 | 10/2007 |
| WO | 2008049213 A1 | 5/2008 |
| WO | 2008049214 A1 | 5/2008 |
| WO | 2008107306 A1 | 9/2008 |
| WO | 2009063093 A2 | 5/2009 |
| WO | 2009101861 A1 | 8/2009 |
| WO | 2011056307 A2 | 5/2011 |
| WO | 2011073516 A1 | 6/2011 |
| WO | 2011132174 A1 | 10/2011 |
| WO | 2012060611 A2 | 5/2012 |
| WO | 2012091421 A2 | 7/2012 |

OTHER PUBLICATIONS

Office Action dated Jun. 13, 2016; U.S. Appl. No. 13/547,880, filed Jul. 12, 2012; 58 pages.
Final Office Action dated Dec. 14, 2016; U.S. Appl. No. 13/547,880, filed Jul. 12, 2012; 33 pages.
Advisory Action dated Mar. 13, 2017; U.S. Appl. No. 13/547,880, filed Jul. 12, 2012; 11 pages.
Office Action dated Mar. 28, 2017; U.S. Appl. No. 13/547,880, filed Jul. 12, 2012; 24 pages.
Office Action dated Jun. 30, 2015; U.S. Appl. No. 13/836,759, filed Mar. 15, 2013; 24 pages.
Notice of Allowance dated Nov. 18, 2015; U.S. Appl. No. 13/836,759, filed Mar. 15, 2013; 33 pages.
Office Action dated Mar. 31, 2016; U.S. Appl. No. 14/854,685, filed Sep. 15, 2015; 56 pages.
Final Office Action dated Sep. 16, 2016; U.S. Appl. No. 14/854,685, filed Sep. 15, 2015; 18 pages.
Notice of Allowance dated Nov. 23, 2016; U.S. App. No. 14/854,685, filed Sep. 15, 2015; 13 pages.
Office Action dated Apr. 8, 2016; U.S. Appl. No. 14/952,574, filed Nov. 25, 2015; 75 pages.
Final Office Action dated Oct. 20, 2016; U.S. Appl. No. 14/952,574, filed Nov. 25, 2015; 36 pages.
Advisory Action dated Jan. 11, 2017; U.S. Appl. No. 14/952,574, filed Nov. 25, 2015; 2 pages.
Office Action dated Feb. 15, 2017; U.S. Appl. No. 14/952,574, filed Nov. 25, 2015; 28 pages.
PCT International Search Report; Application No. PCT/IB2011/051040; dated Jun. 30, 2011; 4 pages.
PCT Written Opinion of the International Searching Authority; Application No. PCT/IB2011/051040; dated Jun. 30, 2011; 7 pages.
Taiwan Office Action; Application No. 100108467; dated Aug. 9, 2013; 12 pages.
PCT International Search Report; Application No. PCT/IB2011/051044; dated Jun. 30, 2011; 4 pages.
PCT Written Opinion of the International Searching Authority; Application No. PCT/IB2011/051044; dated Jun. 30, 2011; 7 pages.
Canadian Office Action; Application No. 2,793,375; dated Oct. 18, 2013; 3 pages.
Canadian Office Action; Application No. 2,793,375; dated Jun. 25, 2014; 3 pages.
Canadian Office Action; Application No. 2,793,375; dated Jul. 10, 2015; 5 pages.
Canadian Office Action; Application No. 2,793,375; dated May 2, 2016; 6 pages.
Canadian Office Action; Application No. 2,793,375; dated Apr. 7, 2017; 4 pages.
Chinese Office Action; Application No. 201180023969.5; dated Oct. 30, 2014; 20 pages.
Chinese Office Action; Application No. 201180023969.5; dated Jul. 20, 2015; 10 pages.
European Examination Report; Application No. 11715273.6; dated Jan. 13, 2016; 6 pages.
European Examination Report; Application No. 11715273.6; dated Jan. 25, 2017; 4 pages.
Japanese Office Action; Application No. 2012-557644; dated Oct. 17, 2013; 5 pages.
Japanese Office Action as Received in Co-pending Application No. 2014-019062 dated Nov. 21, 2014; 2 pages. (No English translation available).
PCT International Search Report; Application No. PCT/IB2010/002932; dated May 9, 2011; 3 pages.
PCT Written Opinion of the International Searching Authority; Application No. PCT/IB2010/002932; dated May 9, 2011; 6 pages.
PCT International Search Report; Application No. PCT/IB2011/001006; dated Aug. 3, 2011; 4 pages.

(56) References Cited

OTHER PUBLICATIONS

PCT Written Opinion of the International Searching Authority; Application No. PCT/IB2011/001006; dated Aug. 3, 2011; 9 pages.
Canadian Office Action; Application No. 2,799,291; dated May 28, 2014; 3 pages.
Canadian Office Action; Application No. 2,799,291; dated Jun. 2, 2015; 4 pages.
Chinese Office Action; Application No. 201180033223.2; dated Jan. 22, 2015; 15 pages.
Chinese Office Action; Application No. 201180033223.2; dated Oct. 10, 2015; 12 pages.
European Examination Report; Application No. 11726170.1; May 9, 2016; 8 pages.
PCT International Search Report; Application No. PCT/IB2011/001008; dated Aug. 3, 2011; 4 pages.
PCT Written Opinion of the International Searching Authority; Application No. PCT/IB2011/001008; dated Aug. 3, 2011; 9 pages.
Canadian Office Action; Application No. 2,799,292; dated May 27, 2014; 3 pages.
Canadian Office Action; Application No. 2,799,292; dated Jun. 8, 2015; 4 pages.
Canadian Office Action; Application No. 2,799,292; dated Feb. 23, 2016; 4 pages.
Chinese Office Action; Application No. 201180033260.3; dated Jun. 3, 2015; 21 pages.
Chinese Office Action; Application No. 201180033260.3; dated Jan. 20, 2016; 7 pages.
European Examination Report; Application No. 11726171.9; dated May 9, 2016; 8 pages.
PCT International Search Report; Application No. PCT/IB2011/001023; dated Oct. 14, 2011; 3 pages.
PCT Written Opinion of the International Searching Authority; Application No. PCT/IB2011/001023; dated Oct. 14, 2011; 5 pages.
Canadian Office Action; Application No. 2,799,295; dated Oct. 31, 2014; 4 pages.
Office Action dated Feb. 22, 2018; U.S. Appl. No. 15/483,759, filed Apr. 10, 2017; 68 pages.
Office Action dated Mar. 22, 2018; U.S. Appl. No. 15/811,259, filed Nov. 13, 2017; 70 pages.
Chinese Office Action; Application No. 201280066681.0; dated Jan. 15, 2018; 12 pages.
McCann, Stephen, et al.; U.S. Appl. No. 15/785,121, filed Oct. 16, 2017; Title: Discovering Network Information Available via Wireless Networks; 65 pages.
Final Office Action dated Dec. 8, 2017; U.S. Appl. No. 13/547,880, filed Jul. 12, 2012; 36 pages.
Notice of Allowance dated Dec. 8, 2017; U.S. Appl. No. 15/048,669, filed Feb. 19, 2016; 10 pages.
Chinese Office Action; Application No. 201280066681.0; dated Sep. 11, 2017; 18 pages.
European Examination Report; Application No. 13816111.2; dated Dec. 4, 2017; 6 pages.
European Examination Report; Application No. 13817511.2; dated Oct. 24, 2017; 4 pages.
Office Action dated Jun. 13, 2018; U.S. Appl. No. 13/547,880, filed Jul. 12, 2012; 39 pages.
Notice of Allowance dated Jul. 18, 2018; U.S. Appl. No. 15/483,759, filed Apr. 10, 2017; 13 pages.
European Extended Search Report; Application No. 18157024.3; dated May 25, 2018; 10 pages.
European Summons to Attend Oral Proceedings; Application No. 12831400.2; dated May 25, 2018; 9 pages.
European Examination Report; Application No. 13816111.2; dated May 14, 2018; 4 pages.
European Examination Report; Application No. 13788377.3; dated Jun. 11, 2018; 7 pages.
Canadian Office Action; Application No. 2,799,295; dated Feb. 24, 2016; 4 pages.
Chinese Office Action; Application No. 201180033296.1; dated Dec. 31, 2014; 14 pages.
Chinese Office Action; Application No. 201180033296.1; dated Dec. 16, 2015; 8 pages.
European Examination Report; Application No. 11726172.7; dated Feb. 10, 2015; 4 pages.
PCT International Search Report; Application No. PCT/IB2011/001018; dated Dec. 5, 2011; 3 pages.
PCT Written Opinion of the International Searching Authority; Application No. PCT/IB2011/001018; dated Dec. 5, 2011; 6 pages.
Canadian Office Action; Application No. 2,799,293; dated Jun. 16, 2014; 2 pages.
Canadian Office Action; Application No. 2,799,293; dated Jul. 13, 2015; 6 pages.
Canadian Office Action; Application No. 2,799,293; dated Jun. 10, 2016; 5 pages.
Chinese Office Action; Application No. 201180033197.3; dated Dec. 12, 2014; 20 pages.
Chinese Office Action; Application No. 201180033197.3; dated Aug. 18, 2015; 16 pages.
European Examination Report; Application No. 11733699.0; dated Jan. 15, 2016; 6 pages.
European Examination Report; Application No. 11733699.0; dated Sep. 6, 2016; 4 pages.
PCT International Search Report; Application No. PCT/CA2012/050635; dated Dec. 10, 2012; 2 pages.
PCT Written Opinion of the International Searching Authority; Application No. PCT/CA2012/050635; dated Dec. 10, 2012; 7 pages.
Canadian Office Action; Application No. 2,848,754; dated Sep. 24, 2015; 4 pages.
Canadian Office Action; Application No. 2,848,754; dated Aug. 15, 2016; 5 pages.
Chinese Office Action; Application No. 201280044612.X; dated Nov. 28, 2016; 15 pages.
European Extended Search Report; Application No. 12831400.2; dated Jul. 3, 2015; 10 pages.
Korean Office Action; Application No. 10-2014-7008921; dated Mar. 23, 2015; 5 pages.
Korean Notice of Allowance; Application No. 10-2014-7008921; dated Sep. 18, 2015; 3 pages.
PCT International Search Report; Application No. PCT/CA2012/050793; dated Jan. 16, 2013; 3 pages.
PCT Written Opinion of the International Searching Authority; Application No. PCT/CA2012/050793; dated Jan. 16, 2013; 5 pages.
Chinese Office Action; Application No. 201280066681.0; dated Mar. 10, 2017; 21 pages.
European Extended Search Report; Application No. 12847065.5; dated Jul. 13, 2015; 11 pages.
Korean Office Action; Application No. 10-2014-7015745; dated Apr. 29, 2015; 11 pages.
Taiwan Search Report; Application No. 102124777; dated Dec. 9, 2014; 1 page.
PCT International Search Report; Application No. PCT/CA2013/050540; dated Sep. 17, 2013; 3 pages.
PCT Written Opinion of the International Searching Authority; Application No. PCT/CA2013/050540; dated Sep. 17, 2013; 3 pages.
European Extended Search Report; Application No. 13816111.2; dated Feb. 3, 2016; 7 pages.
European Examination Report; Application No. 13816111.2; dated Mar. 29, 2017; 4 pages.
Taiwan Office Action; Application No. 102116774; dated Oct. 27, 2014; 16 pages.
Taiwan Office Action; Application No. 102116774; dated Jun. 12, 2015; 16 pages.
PCT International Search Report; Application No. PCT/CA2013/050362; dated Aug. 2, 2013; 4 pages.
PCT Written Opinion of the International Searching Authority; Application No. PCT/CA2013/050362; dated Aug. 2, 2013; 5 pages.
Canadian Office Action; Application No. 2,872,882; dated Sep. 28, 2016; 4 pages.
European Extended Search Report; Application No. 13788377.3; dated Dec. 21, 2015; 8 pages.

(56) References Cited

OTHER PUBLICATIONS

European Examination Report; Application No. 13788377.3; dated Oct. 10, 2016; 6 pages.
Taiwan Search Report; Application No. 102122238; dated Dec. 24, 2014; 1 page.
Taiwan Search Report; Application No. 102122238; dated Sep. 21, 2015; 7 pages.
PCT International Search Report; PCT/CA2013/050539; dated Sep. 16, 2013; 3 pages.
PCT Written Opinion of the International Searching Authority; PCT/CA2013/050539; dated Sep. 16, 2013; 4 pages.
European Extended Search Report; Application No. 13817511.2; dated Feb. 12, 2016; 9 pages.
European Examination Report; Application No. 13817511.2; dated Mar. 8, 2017; 5 pages.
PCT International Search Report; Application No. PCT/CA2014/050060; dated Apr. 15, 2014; 3 pages.
PCT Written Opinion of the International Searching Authority; Application No. PCT/CA2014/050060; dated Apr. 15, 2014; 7 pages.
European Extended Examination Report; Application No. 14749467.8; dated Jun. 22, 2016; 8 pages.
McCann, Stephen, et al.; U.S. Appl. No. 16/176,467, filed Oct. 31, 2018; Title: Wireless Network Service Transaction Protocol; 59 pages.
Final Office Action dated Oct. 18, 2018; U.S. Appl. No. 13/547,880, filed Jul. 12, 2012; 32 pages.
Office Action dated Sep. 11, 2018; U.S. Appl. No. 15/785,121, filed Oct. 16, 2017; 59 pages.
Final Office Action dated Nov. 1, 2018; U.S. Appl. No. 15/811,259, filed Nov. 13, 2017; 18 pages.
Indian Office Action; Application No. 7976/CHENP/2012; dated Aug. 30, 2018; 6 pages.
Canadian Office Action; Application No. 2,854,947; dated Aug. 9, 2018; 3 pages.
Chinese Reexamination Notification as Received in Co-pending Application No. 201280066681.0 dated Aug. 29, 2018; 13 pages. (No English translation available).
European Examination Report; Application No. 12847065.5; dated Oct. 12, 2018; 6 pages.
European Extended Search Report; Application No. 18166755.1; dated Aug. 22, 2018; 6 pages.
WI-FI Alliance; "Wi-Fi Peer-to-Peer (P2P) Technical Specification"; Version 1.2; 2010; 159 pages.
Notice of Allowance dated Jun. 14, 2017; U.S. Appl. No. 14/298,289, filed Jun. 6, 2014; 8 pages.
Notice of Allowance dated Jun. 30, 2017; U.S. Appl. No. 14/952,574, filed Nov. 25, 2015; 24 pages.
Office Action dated Aug. 11, 2017; U.S. Appl. No. 15/048,669, filed Feb. 19, 2016; 37 pages.
Canadian Office Action; Application No. 2,799,293; dated May 17, 2017; 4 pages.
European Examination Report; Application No. 11733699.0; dated Jul. 19, 2017; 4 pages.
Canadian Office Action; Application No. 2,848,754; dated Jul. 28, 2017; 4 pages.
Chinese Office Action as Received in Co-pending Application No. 201280044612.X dated Jun. 23, 2017; 5 pages. (No English translation available).
European Examination Report; Application No. 12831400.2; dated Jun. 16, 2017; 6 pages.
Canadian Office Action; Application No. 2,872,882; dated Jun. 6, 2017; 3 pages.
McCann, Stephen, et al.; U.S. Appl. No. 15/811,259, filed Nov. 13, 2017; Title: Extended Service Set Transitions in Wireless Networks; 45 pages.
Office Action dated Jan. 2, 2013; U.S. Appl. No. 12/780,603, filed May 14, 2010; 35 pages.
Final Office Action dated Jun. 5, 2013; U.S. Appl. No. 12/780,603, filed May 14, 2010; 30 pages.
Office Action dated Dec. 17, 2013; U.S. Appl. No. 12/780,603, filed May 14, 2010; 27 pages.
Final Office Action dated Jun. 3, 2014; U.S. Appl. No. 12/780,603, filed May 14, 2010; 28 pages.
Notice of Allowance dated Sep. 2, 2014; U.S. Appl. No. 12/780,603, filed May 14, 2010; 7 pages.
Office Action dated Jun. 8, 2012; U.S. Appl. No. 12/780,709, filed May 14, 2010; 6 pages.
Office Action dated Aug. 23, 2012; U.S. Appl. No. 12/780,709, filed May 14, 2010; 13 pages.
Notice of Allowance dated Jan. 18, 2013; U.S. Appl. No. 12/780,709, filed May 14, 2010; 11 pages.
Office Action dated Apr. 3, 2012; U.S. Appl. No. 12/780,722, filed May 14, 2010; 15 pages.
Notice of Allowance dated Oct. 19, 2012; U.S. Appl. No. 12/780,722, filed May 14, 2010; 6 pages.
Notice of Allowance dated Feb. 5, 2013; U.S. Appl. No. 12/780,722, filed May 14, 2010; 6 pages.
Office Action dated May 2, 2012; U.S. Appl. No. 12/780,614, filed May 14, 2010; 5 pages.
Office Action dated Jul. 19, 2012; U.S. Appl. No. 12/780,614, filed May 14, 2010; 14 pages.
Office Action dated Nov. 16, 2012; U.S. Appl. No. 12/780,614, filed May 14, 2010; 6 pages.
Office Action dated Mar. 25, 2013; U.S. Appl. No. 12/780,614, filed May 14, 2010; 10 pages.
Final Office Action dated Jul. 19, 2013; U.S. Appl. No. 12/780,614, filed May 14, 2010; 7 pages.
Notice of Allowance dated Oct. 31, 2013; U.S. Appl. No. 12/780,614, filed May 14, 2010; 7 pages.
Office Action dated Nov. 16, 2012; U.S. Appl. No. 13/045,622, filed Mar. 11, 2011; 19 pages.
Final Office Action dated Jul. 12, 2013; U.S. Appl. No. 13/045,622, filed Mar. 11, 2011; 17 pages.
Office Action dated Oct. 11, 2012; U.S. Appl. No. 13/045,658, filed Mar. 11, 2011; 11 pages.
Final Office Action dated May 15, 2013; U.S. Appl. No. 13/045,658, filed Mar. 11, 2011; 11 pages.
Advisory Action dated Jul. 26, 2013; U.S. Appl. No. 13/045,658, filed Mar. 11, 2011; 3 pages.
Office Action dated Sep. 23, 2016; U.S. Appl. No. 13/045,658, filed Mar. 11, 2011; 77 pages.
Notice of Allowance dated Nov. 18, 2016; U.S. Appl. No. 13/045,658, filed Mar. 11, 2011; 7 pages.
Office Action dated Jul. 12, 2013; U.S. Appl. No. 13/234,799, filed Sep. 16, 2011; 16 pages.
Notice of Allowance dated Jan. 30, 2014; U.S. Appl. No. 13/234,799, filed Sep. 16, 2011; 7 pages.
Office Action dated Apr. 20, 2015; U.S. Appl. No. 14/298,289, filed Jun. 6, 2014; 10 pages.
Final Office Action dated Aug. 5, 2015; U.S. Appl. No. 14/298,289, filed Jun. 6, 2014; 34 pages.
Advisory Action dated Oct. 15, 2015; U.S. Appl. No. 14/298,289, filed Jun. 6, 2014; 3 pages.
Office Action dated Nov. 16, 2015; U.S. Appl. No. 14/298,289, filed Jun. 6, 2014; 13 pages.
Final Office Action dated Mar. 21, 2016; U.S. Appl. No. 14/298,289, filed Jun. 6, 2014; 21 pages.
Advisory Action dated Jun. 8, 2016; U.S. Appl. No. 14/298,289, filed Jun. 6, 2014; 4 pages.
Office Action dated Aug. 23, 2016; U.S. Appl. No. 14/298,289, filed Jun. 6, 2014; 8 pages.
Final Office Action dated Jan. 3, 2017; U.S. Appl. No. 14/298,289, filed Jun. 6, 2014; 13 pages.
Office Action dated Mar. 30, 2017; U.S. Appl. No. 14/298,289, filed Jun. 6, 2014; 7 pages.
Office Action dated Jul. 11, 2013; U.S. Appl. No. 13/407,444, filed Feb. 28, 2012; 14 pages.
Office Action dated Dec. 31, 2013; U.S. Appl. No. 13/407,444, filed Feb. 28, 2012; 11 pages.
Final Office Action dated Jun. 3, 2014; U.S. Appl. No. 13/407,444, filed Feb. 28, 2012; 11 pages.

(56) References Cited

OTHER PUBLICATIONS

Notice of Allowance dated Sep. 17, 2014; U.S. Appl. No. 13/407,444, filed Feb. 28, 2012; 5 pages.
Office Action dated Feb. 4, 2014; U.S. Appl. No. 13/548,864, filed Jul. 13, 2012; 15 pages.
Final Office Action dated Jul. 11, 2014; U.S. Appl. No. 13/548,864, filed Jul. 13, 2012; 10 pages.
Office Action dated Oct. 30, 2014; U.S. Appl. No. 13/548,864, filed Jul. 13, 2012; 10 pages.
Notice of Allowance dated May 1, 2015; U.S. Appl. No. 13/548,864, filed Jul. 13, 2012; 14 pages.
Office Action dated Jan. 14, 2014; U.S. Appl. No. 13/469,618, filed May 11, 2012; 28 pages.
Final Office Action dated Jul. 9, 2014; U.S. Appl. No. 13/469,618, filed May 11, 2012; 31 pages.
Office Action dated Jan. 21, 2015; U.S. Appl. No. 13/469,618, filed May 11, 2012; 26 pages.
Notice of Allowance Jul. 23, 2015; U.S. Appl. No. 13/469,618, filed May 11, 2012; 15 pages.
Office Action dated Dec. 31, 2014; U.S. Appl. No. 13/547,880, filed Jul. 12, 2012; 19 pages.
Final Office Action dated Aug. 27, 2015; U.S. Appl. No. 13/547,880, filed Jul. 12, 2012; 26 pages.
Advisory Action dated Dec. 2, 2015; U.S. Appl. No. 13/547,880, filed Jul. 12, 2012; 3 pages.
McCann, Stephen, et al.; U.S. Appl. No. 15/483,759, filed Apr. 10, 2017; Title: Wireless Network Service Transaction Protocol; 59 pages.
Hiller, T., et al.; "A Container Type for the Extensible Authentication Protocol (EAP)"; Network Working Group; draft-hiller-eap-tlv-01.txt; May 2003; 16 pages.
McCann, Stephen; "Emergency URN Information"; IEEE 802.11-10/0026r0; Jan. 18, 2010; 6 pages.
Rosen, B., et al.; "Framework for Emergency Calling using Internet Multimedia"; draft-ietf-ecrit-framework-10; Jul. 27, 2009; 74 pages.
Schulzrinne, H., et al.; "Extensions to the Emergency Services Architecture for dealing with Unauthenticated and Unauthorized Devices"; draft-ieff-ecrit-unauthenticated-access-06.txt; Apr. 30, 2013; 38 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11e; Nov. 11, 2005; 211 pages.
Li, Wei, et al.; "A Reliable Active Scanning Scheme for the IEEE 802.11 MAC Layer Handoff"; IEEE; 2003; 4 pages.
Montemurro, Michael; "TGae Requirements and Use Cases"; IEEE 802.11-10/0093r5; Jan. 21, 2010; 6 pages.
Bajko, Gabor; "Tutorial on Location and Emergency Services"; Nokia; Sep. 10, 2008; 45 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Draft P802.11-REVmb/D9.2; Jul. 2011; 2778 pages; (Part 1: pp. 1-1369).
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Draft P802.11-REVmb/D9.2; Jul. 2011; 2778 pages; (Part 2: pp. 1370-2778).
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11u; Feb. 25, 2011; 208 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11k; Jun. 12, 2008; 244 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11; Mar. 29, 2012; 2793 pages.
Lin, Chen-Han, et al.; "Mobile Intelligent Agent Technologies to Support Intelligent Handover Strategy"; Proceedings of the Workshop on Wireless, Ad Hoc and Sensor Network; vol. 1; 2005; 8 pages.
"Wi-Fi Peer-to-Peer (P2P) Technical Specification"; Draft Version 1.14; Wi-Fi Alliance Technical Committee P2P Task Group; Jun. 25, 2010; 22 pages.
"Draft Standard for Local and Metropolitan Area Networks: Media Independent Handover Services"; IEEE P802.21/D8.0; Dec. 2007; 343 pages.
Barber, Phillip, et al.; "GAS Version Control in 11ai"; Document: IEEE 802.11-11, 1498-01-00ai; Oct. 24, 2011; 16 pages.
Bumiller, George; "Notes on Interworking with External Networks"; Document: IEEE 802.11-09/1272r2; Jul. 22, 2010; 156 pages.
Cao, Z., et al.; "DHCPv4 and DHCPv6 Options for Access Network Query Protocol Servers"; draft-cao-dhc-anqp-option-00; Jul. 9, 2012; 8 pages.
Kneckt, Jarkko, et al.; "Active Scanning Enabling FILS"; IEEE 802.11-11/1619r1; Jan. 16, 2012; 15 pages.
Campbell, Andrew T., et al.; "Design, Implementation, and Evaluation of Cellular IP"; IEEE Personal Communications; Aug. 2000; 8 pages.
Nakano, Hiroki; "Upper Layer Data on Management Frames"; IEEE 802.11-11/1003r1; Jul. 18, 2011; 17 pages.
Bajko, Gabor; "IP Address Configuration During Association"; IEEE P802.11; Jul. 20, 2011; 5 pages.
Office Action dated Jun. 29, 2012; U.S. Appl. No. 12/780,603, filed May 14, 2010; 37 pages.
McCann, Stephen, et al.; U.S. Appl. No. 15/261,131, filed Jan. 29, 2019; Title: Discovering Network Information Availabie via Wireless Networks; 65 pages.
WI-FI Alliance; "Wi-Fi Peer-to-Peer (P2P) Technical Specification"; Version 1.1; 2010; 159 pages.
Advisory Action dated Jan. 29, 2019; U.S. Appl. No, 13/547,880, filed Jul. 12, 2012; 4 pages.
Notice of Allowance dated Nov. 30, 2018; U.S. Appl. No. 15/785,121, filed Oct. 16, 2017; 7 pages.
Advisory Action dated Jan. 14, 2019; U.S. Appl. No. 15/811,259, filed Nov. 13, 2017; 2 pages.
European Examination Report; Application No. 11726170.1; Nov. 19, 2018; 6 pages.
European Examination Report; Application No. 11726171.9; Nov. 20, 2018; 5 pages.
Chinese Reexamination Notification as Received in Co-pending Application No. 201280066681.0 dated Dec. 29, 2018; 13 pages. (No English translation available).
European Summons to Attend Oral Proceedings; Application No. 13816111.2; Jan. 21, 2019; 6 pages.
European Examination Report; Application No. 14749467.8; dated Dec. 7, 2018; 7 pages.
Frikha, Mounir, et al.; "Micro Mobility in the IP Networks"; Telecommunication Systems; Apr. 2006; 16 pages.
European Extended Search Report; Application No. 19171474.0; May 23, 2019; 11 pages.
Office Action dated Apr. 5, 2019; U.S. Appl. No. 13/547,880 filed Jul. 12, 2012; 34 pages.
Notice of Allowance dated Feb. 25, 2019; U.S. Appl. No. 15/811,259 filed Nov. 13, 2017; 13 pages.
Canadian Office Action; Application No, 2;878,980; dated Feb. 19, 2019; 3 pages.

(56) References Cited

OTHER PUBLICATIONS

Canadian Office Action; Application No. 2,878,736; dated Mar. 6, 2019; 6 pages.
European Extended Search Report; Application No. 19154310.7; dated Apr. 2, 2019; 15 pages.

* cited by examiner

NEGOTIATION OF QUALITY OF SERVICE (QOS) INFORMATION FOR NETWORK MANAGEMENT TRAFFIC IN A WIRELESS LOCAL AREA NETWORK (WLAN)

CROSS-REFERENCE TO RELATED APPLICATIONS

This application is a continuation of U.S. patent application Ser. No. 13/045,658 filed Mar. 11, 2011 by Michael Peter Montemurro, et al. entitled, "Negotiation of Quality of Service (QoS) Information for Network Management Traffic in a Wireless Local Area Network (WLAN)" which claims priority to Canadian Patent Application No. 2,696,037 filed Mar. 15, 2010 entitled "Advertisement and Dynamic Configuration of WLAN Prioritization States", both of which are incorporated by reference herein as if reproduced in their entirety.

TECHNICAL FIELD

The technology described herein generally relates to wireless local area networks (WLANs), and more particularly, to the handling of network management traffic in a WLAN.

BACKGROUND

The enhanced Distributed Channel Access (EDCA) of the Institute of Electrical and Electronics Engineers (IEEE) standard 802.11 is an enhancement to the original IEEE 802.11 Media Access Control (MAC) sublayer and is a method of medium access described in the standard amendment document IEEE 802.11e. EDCA provides four prioritized queues for transmission, where each queue is associated with a different access category (AC). The four access categories defined, for example, in IEEE standard 802.11e, in decreasing priority, are AC_VO, AC_VI, AC_BE and AC_BK, named for voice traffic, video traffic, best-effort traffic, and background traffic, respectively. The queues use a contention-based mechanism to determine the next frame for transmission. The queue parameters are set such that the high priority queues have a preference for access to the wireless medium.

Management frames are the foundation of network management traffic in a Wireless Local Area Network (WLAN). Current IEEE 802.11 standards dictate that, in any access point (AP) or non-AP station (STA), management frames are to be handled via the EDCA queue of highest priority.

DETAILED DESCRIPTION

Figure 1:
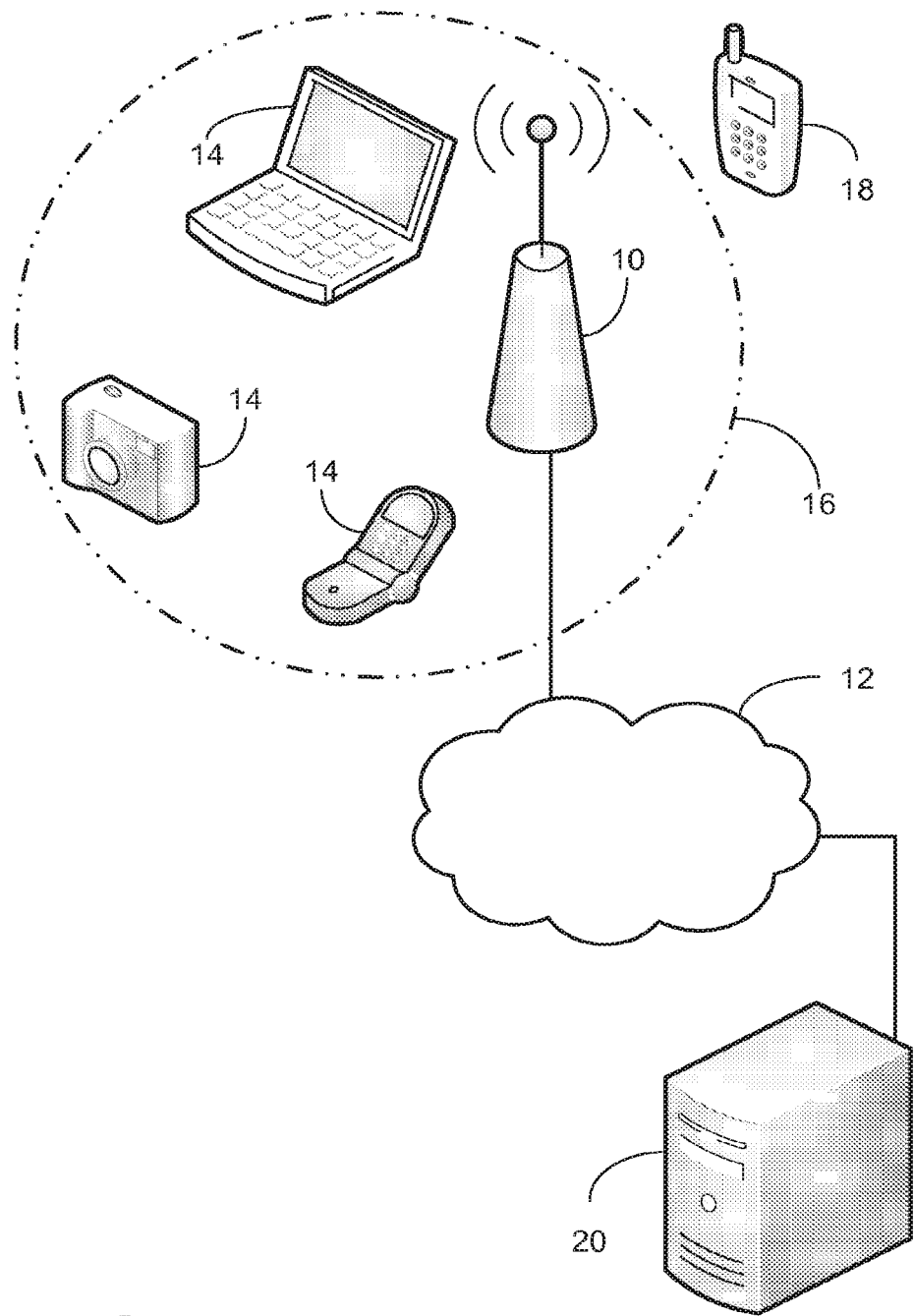
FIG. 1 is an illustration of an example network architecture for advertisement of management frame QoS (MFQ) information within a basic service set (BSS)

The disclosure can be better understood with reference to the following drawings and description. The components in the figures are not necessarily to scale, emphasis instead being placed upon illustrating the principles of the disclosed technology. Moreover, in the figures, like referenced numerals designate corresponding parts or elements throughout the different views. The following description is merely exemplary in nature and is in no way intended to limit the disclosure, its application, or uses. As used herein, the term "module" refers to an Application Specific Integrated Circuit (ASIC), an electronic circuit, a processor (shared, dedicated, or group) and memory that executes one or more software or firmware programs stored in the memory, a combinational logical circuit, and/or other suitable components that provide the described functionality. Herein, the phrase "coupled with" is defined to mean directly connected to or indirectly connected through one or more intermediate components. Such intermediate components may include both hardware and software based components.

Recent amendments to the IEEE 802.11 family of standards have increased the number and type of management frames, resulting in an increase in network management traffic. If all management frames continue to be handled as frames of the highest priority, this may adversely affect overall network performance or the ability to provide Quality of Service (QoS) to data frames or both. For example, it would not be desirable for the transmission of diagnostic reports to reduce the quality of a voice call.

By way of introduction, the disclosure is related to the prioritization of management frames and are merely exemplary in nature. More particularly, the present disclosure describes the implementation of prioritization scheme(s) that define various access categories of different management frames, where each of the access categories is associated with a respective prioritization used for transmission. An access category may be defined for a group of management frame subtypes or for an individual management frame subtype.

In the present disclosure, access categories AC_BK, AC_BE, AC_VI and AC_VO named for background traffic, best-effort traffic, video traffic, and voice traffic, respectively, are used to illustrate the concepts described herein. However, it is contemplated that the list of access categories may be different. If the list of access categories is different, then the number or definition or both of access-category-dependent queues in a compatible media access control (MAC) sublayer will also be different. An access category is a label given to a common set of enhanced distributed channel access (EDCA) parameters that are used, for example, by a station to contend for a channel in order to transmit information with certain priorities. In other words, each respective access category (e.g., AC_BK, AC_BE, AC_VI and AC_VO) is associated with (i.e., characterized by or indicative of) a respective priority used for transmission by a station.

Each data frame generated by an application in a non-access point (non-AP) station (STA) already has an indication of its priority. As used herein, the term "data frame" includes both a content data frame and a signaling data frame. For example, any one or any combination of the following values is an example indication of the priority of a data frame: a user priority assigned to the data frame; the IP-ToS (Internet Protocol-Type of Service) value in an IP header of the data frame; and a Differentiated Services Code Point (DSCP) value in the IP header of the data frame. The classification of a data frame to an access category by a MAC sublayer module of a non-AP STA may be based upon the data frame's indication of priority. For example, data frames having various user priorities may be classified as follows:

| User Priority | Access Category |
|---|---|
| 001 | AC_BK |
| 010 | AC_BK |
| 000 | AC_BE |
| 011 | AC_BE |
| 100 | AC_VI |
| 101 | AC_VI |
| 110 | AC_VO |
| 111 | AC_VO |

Conventionally, management frames, in contrast to data frames, do not have an indication of priority, so there is no inherent classification of a management frame to an access category. Management frames are generated within the MAC sublayer module of an AP and/or a STA.

As proposed in the present disclosure, the prioritization scheme includes a default management frame QoS (MFQ) policy, which is a static definition of access categories for management frames. The default MFQ policy is implementable by a MAC sublayer module of an AP or non-AP STA. The default MFQ policy is known to all APs and STAs and is therefore not advertised. An example default MFQ policy includes the following definitions, where the access category of management frames not included in the following table is AC_BE:

| Management Frame Subtypes | Access Category |
|---|---|
| Beacon | AC_VO |
| (Re)Association Request/Response | |
| Probe Request (individually addressed) | |
| Probe Response | |
| Announcement Traffic Indication Message (ATIM) | |
| Dissassociation | |
| Authentication | |
| Deauthentication | |
| Spectrum management - channel switch announcement | |
| QoS | |
| Block Ack | |
| Public - extended channel switch announcement | |
| Public - measurement pilot | |
| Public - TDLS Discovery Response | |
| Fast BSS Transition | |
| HT | |
| SA Query | |
| Protected Dual of Public Action - extended channel switch announcement | |
| Mesh Action - HWMP Mesh Path Selection | AC_VI |
| Self Protected | |
| Spectrum Management | AC_BE |
| Public | |
| Protected Dual of Public Action | |
| WNM | |
| Unprotected WNM | |
| Mesh Action | |
| Multihop Action | |
| Vendor-specific Protected | |
| Vendor-specific | |

As proposed in the present disclosure, a MFQ policy will apply to a basic service set (BSS), which comprises an AP and any non-AP STAs associated with the AP. Therefore, the MFQ policy in effect in one BSS may differ from the MFQ policy in effect in a different BSS. In particular, the MFQ policy in effect in a BSS may differ from the default MFQ policy. The MFQ policies in effect in different BSSs belonging to the same extended service set (ESS) may be identical to one another, but this is not necessary. The MFQ policy in effect in a BSS may change over time. The prioritization scheme for management frames of the present disclosure is therefore dynamic in that the prioritization scheme allows for changes over time in the definition of access categories for management frame subtypes.

Furthermore, as proposed herein, the AP of the BSS will determine the MFQ policy that is currently in effect in the BSS and transmit management frames according to that policy. The AP advertises MFQ information that describes how the MFQ policy currently in effect in the BSS differs from the default MFQ policy. Therefore, the MFQ policy currently in effect in a BSS may be referred to as the advertised MFQ policy, even though only the differences between the MFQ policy currently in effect in the BSS and the default MFQ policy are advertised. An associated STA is therefore informed of the MFQ policy currently in effect in the BSS through receipt of the advertised MFQ information.

In accordance with the present disclosure, an associated STA may follow the MFQ policy determined by the AP with which the STA is associated. Alternatively, an associated STA may follow the MFQ policy determined by the AP with which the STA is associated unless the STA has successfully negotiated a different MFQ policy with the AP. Compliance of an associated STA to the advertised MFQ policy or to the negotiated MFQ policy is not actually checked by the AP with which the STA is associated, because prioritization of management frames is handled internally in the STA prior to transmission of the frames.

Advertisement of MFQ Policy by AP

FIG. 1 is an illustration of an example network architecture for advertisement of MFQ information by an AP of a wireless local area network (WLAN). The WLAN may be configured using IEEE 802.11 technology, and/or other wireless communication standards including other WLAN standards, personal area network (PAN) standards, wide area network (WAN) standards, or cellular communication standards or networks for providing wireless network communications.

In the network architecture shown in FIG. 1, a WLAN access point (AP) 10 is coupled to a network 12, possibly through a wired communication interface, a satellite interface, a Worldwide Interoperability for Microwave Access (WiMAX®) communication interface, or any other suitable communication interface. AP 10 broadcasts beacon frames. Stations 14 are WLAN devices that are within range (i.e., within communication range) of AP 10 and are associated with AP 10. AP 10 and stations 14 together form a basic service set (BSS) 16. A basic service set identifier (BSSID) identifies BSS 16, and is included in every management frame sent by AP 10 or STAs 14. The MAC address of AP 10 is often used as the BSSID. The network to which BSS 16 belongs is identified by its network name, referred to as a service set identifier (SSID). Unless hidden, the SSID is included in certain downlink frames, including, for example, beacon frames and probe response frames transmitted by AP 10.

A station (STA) 18 is within range of AP 10 but is not associated with AP 10. STA 18 is therefore not part of the BSS 16. STA 18 may detect the existence of AP 10 by undergoing a network discovery process to identify the available wireless local area networks within range. In some implementations, the network discovery process includes the receipt by STA 18 of beacon frames broadcasted by AP 10. In some implementations, the network discovery process includes the transmission by STA 18 of a probe request frame and receipt by STA 18 of a probe response frame from AP 10 in response to the probe request frame.

A server 20 is coupled to AP 10 through network 12. In the present implementation, server 20 is local to AP 10. Alternatively, server 20 may be remote to AP 10, and the coupling of server 20 to AP 10 may occur via other networks in addition to network 12. For example, if server 20 is remote to AP 10, the coupling of server 20 to AP 10 may occur via the Internet.

As explained in further detail in this disclosure, AP 10 advertises MFQ information that describes how the current MFQ policy in effect in BSS 16 differs from the default MFQ policy, and this advertisement may be received and interpreted by associated STAs, such as STAs 14, and by non-associated STAs, such as STA 18. Upon receipt of the advertised MFQ policy, a classification of management frames of the associated STA may be adjusted in accordance with the advertised MFQ policy. A non-associated STA, such as STA 18, may use Access Network Query Protocol (ANQP) to query an AP, such as AP 10, for the advertised MFQ policy. For example, a non-associated STA that is actively scanning may issue a probe request or a Generic Advertisement Service (GAS) request on an AP's channel in order to determine what MFQ policy the AP is implementing. However, such a non-associated STA may choose not to follow that MFQ policy. It should be noted that AP 10 transmits management frames according the current MFQ policy in effect (i.e., being implemented) within BSS 16.

Figure 2:
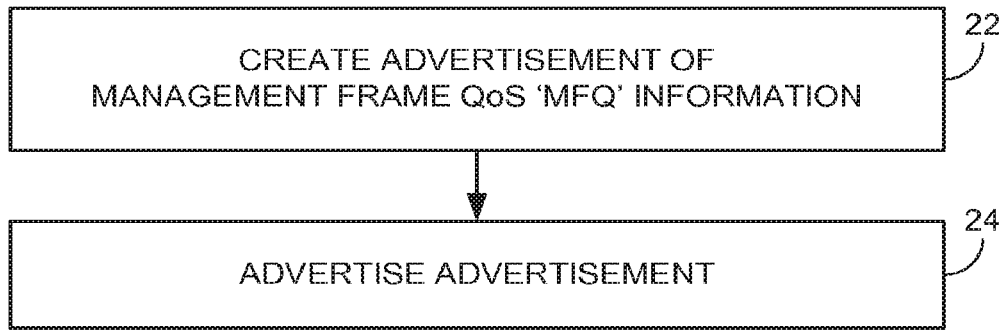
FIG. 2 is an illustration of an example method to be implemented by an access point (AP) for advertisement of MFQ information.

FIG. 2 illustrates an example method to be implemented by an AP for advertisement of MFQ information. At 22, the AP creates an advertisement of MFQ information that describes how the current MFQ policy in effect in the BSS differs from the default MFQ policy. At 24, the AP advertises the advertisement, thus advertising the current MFQ policy in effect in the BSS (i.e., the current MFQ policy). For the sake of simplicity and brevity, the present disclosure discusses one format of the advertisement generated by the AP though those skilled in the art will appreciate that other forms of the advertisement are anticipated.

Figure 3:
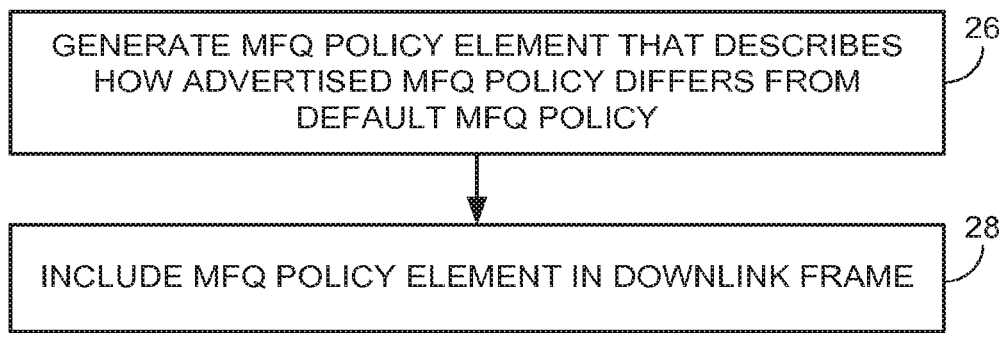
FIG. 3 is an illustration of an example method to be implemented by an AP for including MFQ information in a downlink frame.

In the example method illustrated in FIG. 3, the advertisement is in the form of a MFQ policy element. The MFQ policy element defines access categories of management frames and, as mentioned above, is used to advertise and exchange MFQ policy between a STA and an AP. The AP generates a MFQ policy element at 26. At 28, the AP includes the MFQ policy element in downlink frames, for example, in beacon frames or in probe response frames or in both. As part of the process of generating a beacon frame and as part of the process of generating a probe response frame, the AP may regenerate the MFQ policy element to reflect the current MFQ policy in effect in the BSS. The MFQ policy element is not reused from an earlier beacon frame or probe response frame. Rather, the MFQ policy element is generated as part of the process of generating the beacon frame or probe response frame in which the MFQ policy element is to be included.

An AP may indicate support for management frame prioritization by setting an appropriate bit, referred to herein as MFQActivated, in the Capabilities field of the Extended Capabilities information element (IE) to a value of 1 or may indicate lack of support for management frame prioritization by setting that bit to a value of 0. One of the currently reserved bits of the Capabilities field of the Extended Capabilities IE (as defined in IEEE Std 802.11-2007) may be used for this purpose. Alternatively, presence of the MFQ policy element in the downlink frame may be an indication to STAs receiving the downlink frame that MFQ is enabled, and lack of presence of the MFQ policy element in the downlink frame may be an indication to STAs receiving the downlink frame that either the AP sending the downlink frame does not support MFQ, or the AP sending the downlink frame supports MFQ and there is no change to the current MFQ policy for the AP to advertise.

When the AP changes its current MFQ policy in effect in the BSS, the change is communicated in all the beacon frames transmitted during the Delivery Traffic Indication Message (DTIM) interval following the MFQ policy change. The change may be indicated, for example, by setting a change bit to a value of 1. The change bit may be part of the MFQ policy element or may be in another part of the beacon frame. Setting the change bit to 1 in all beacon frames transmitted during the DTIM interval following the MFQ policy change will ensure that most, if not all, STAs in the BSS will be informed of a change in MFQ policy for the BSS. For example, even if a STA is in an awake state only for beacon frames that includes DTIMs and is not awake to receive other beacon frames, that STA will still be informed of the change in MFQ policy, and therefore be prompted to check the MFQ policy element in the beacon frame. However, a STA that has set its ReceiveDTIMs parameter to "No" may not receive a beacon frame that informs of a change in MFQ policy for the BSS.

Figure 4:
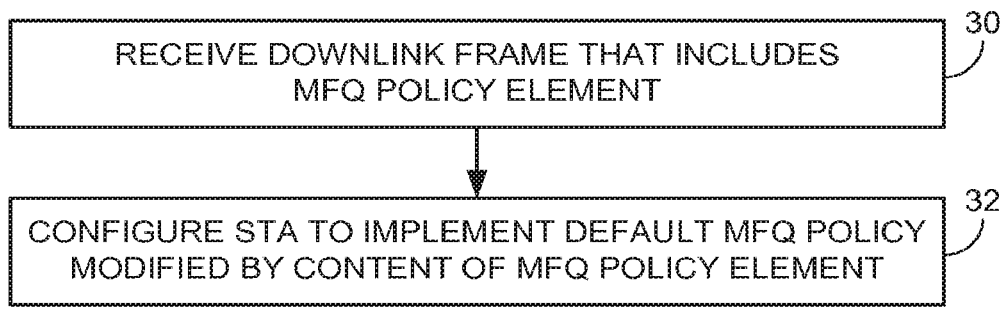
FIG. 4 is an illustration of an example method to be implemented by a station (STA) associated with an AP for handling MFQ information received from the AP in a downlink frame.

FIG. 4 illustrates an example method to be implemented by a STA associated with an AP for handling MFQ information received from the AP in a downlink frame. At 30, the STA receives a downlink frame that includes a MFQ policy element. At 32, the STA configures itself to implement the advertised MFQ policy. In other words, the STA configures itself to implement the default MFQ policy modified by the content of the MFQ policy element. As such, the STA assigns an access category to each management frame according to an access category assignment indicated in the MFQ policy element (i.e., the advertised MFQ policy).

Figure 5:
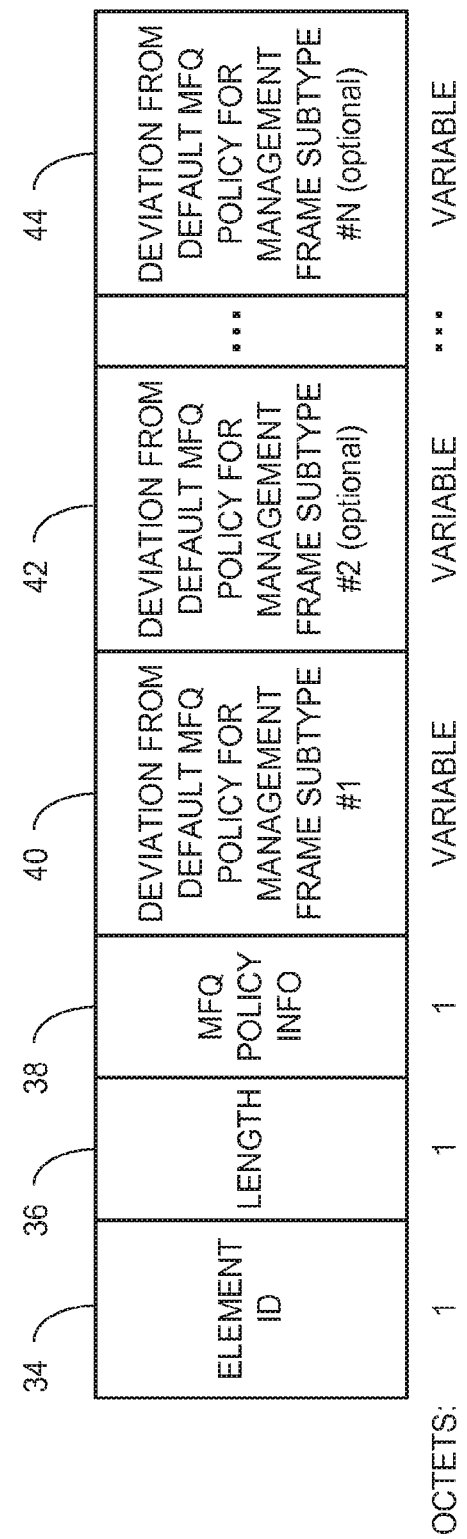
FIG. 5 is an illustration of example formatting information for a MFQ element.

FIG. 5 illustrates example formatting information for a MFQ policy element. In order that the advertisement may be received by associated STAs and by non-associated STAs, the size of the MFQ policy element complies with any upper limit on the size of an element in non-associated mode. In one implementation, an Element ID field 34 which is 1 octet in length includes a value indicating that the element is a MFQ policy element. A length field 36 which is also 1 octet in length stores the length of the MFQ policy element. The length of the MFQ policy element may vary, because information for multiple deviations from the default MFQ policy may be included in the MFQ policy element. A MFQ policy info field 38, alternatively named "Access Category Assignment Count" field 38, is 1 octet in length and includes a value indicating the number of deviations which are included in the MFQ policy element. MFQ policy info field 38 may also include a change bit to indicate whether the MFQ policy has changed. The "Deviation from default MFQ policy for management frame subtype #1" field 40, alternatively named "Management Prioritization Policy for Category #1" field 40, "Access Category Assignment #1" field 40, or "Access Category Mapping #1" field 40, stores a first deviation to be included in the advertised MFQ policy. Optionally, additional deviations may be provided in fields 42 and 44. Fields 40, 42 and 44 are all of variable length.

Any one or any combination of the following factors may be taken into account when determining a change to a MFQ policy: detection of changes in network conditions, anticipation of changes in network conditions, detection of changes in network loading (at the BSS level or at the ESS level or both), anticipation of changes in network loading (at the BSS level or at the ESS level or both), detection of changes in AP loading, anticipation of changes in AP loading, the presence or lack of a multi-media stream, detection of changes in a multi-media stream, anticipation of changes in a multi-media stream, and other operating conditions.

Negotiated MFQ Policy

Figure 6:
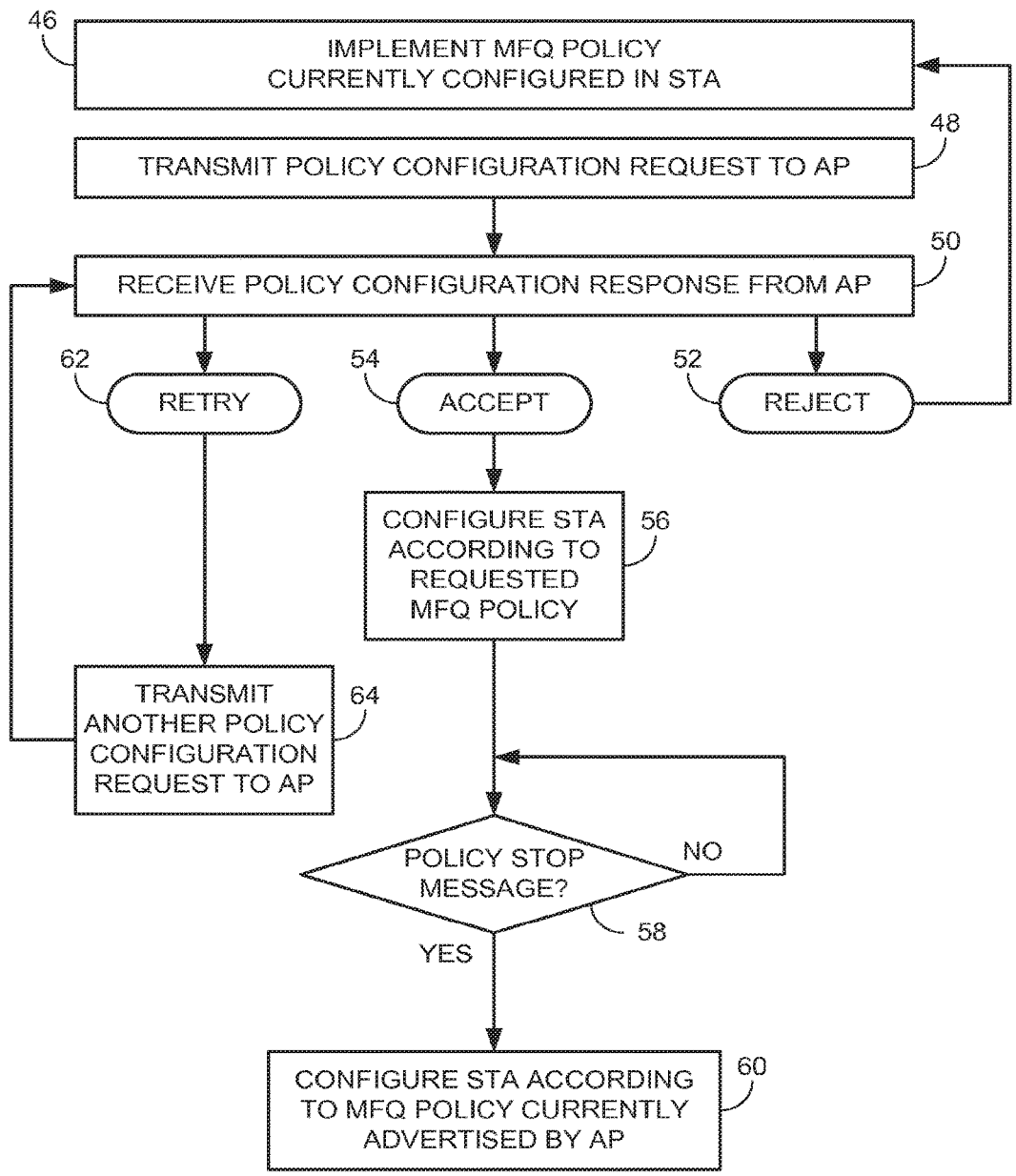
FIG. 6 is an illustration of an example method to be performed by a STA associated with an AP for requesting permission from the AP to deviate from MFQ information currently advertised by the AP, receiving a policy configuration response from the AP, and acting on the received policy configuration response.

An associated non-AP STA may negotiate with the AP with which it is associated in order to deviate from the advertised MFQ policy (i.e., the configured MFQ policy). FIG. 6 illustrates an example method to be performed by a STA associated with an AP for requesting permission from the AP to deviate from the advertised MFQ policy, receiving a response from the AP, and acting on the received response.

The method begins at 46 with a STA implementing the MFQ policy configured in its MAC sublayer module. At 48, the STA transmits a policy configuration request, also referred to herein as an "MFQ Policy Config Request", to the AP to request a change in the MFQ policy used to transmit management frames between the STA and the AP (i.e., the responding AP). In other words, a MFQ Policy Config Request is used to negotiate a change or modification to the MFQ policy between a STA and an AP with which the STA is associated. The MFQ Policy Config Request transmitted by the STA includes or indicates a change(s) to the MFQ policy being implemented. The policy configuration request may be transmitted in response to a triggering event, for example, a network problem, application-related diagnostics, or a financial transaction. At 50, the STA receives a policy configuration response from the AP.

The policy configuration request (i.e., the MFQ Policy Config Request) includes a MFQ policy element describing how a requested MFQ policy differs from the default MFQ policy. In other words, the MFQ policy element indicates a proposed change with reference to the default MFQ policy. Any one or any combination of the following factors may taken into account when determining a requested MFQ policy: detection of changes in the associated non-AP STA due to diminishing battery power levels, anticipation of changes in the associated non-AP STA due to diminishing battery power levels, detection that a current predicted motion of the non-AP STA will shortly take the non-AP STA out of radio coverage, so the requested MFQ policy prioritizes signaling frames over a poor link.

If, as shown at 52, a policy configuration response, also referred to as a "MFQ Policy Config Response", from the AP indicates that a policy configuration request has been rejected by the AP (i.e., the proposed change(s) in the MFQ Policy Config Request has (have) been rejected), the STA that transmitted the request may continue at 46 to transmit management frames in accordance with the MFQ policy configured in its MAC sublayer module.

In this document, a "negotiated MFQ policy" is a requested MFQ policy requested in a policy configuration request that has been accepted by the AP. If, as shown at 54, a policy configuration response received from the AP indicates that a policy configuration request has been accepted by the AP (i.e., the proposed change(s) in the MFQ Policy Config Request has (have) been accepted), the STA proceeds at 56 to implement the negotiated MFQ policy by configuring its MAC sublayer module to implement the default MFQ policy modified by the content of the policy element (i.e., the proposed changes) in the policy configuration request that has been accepted. In some implementations, both the STA and the AP may transmit management frames to each other in accordance with the changes to the MFQ policy that were indicated in the MFQ Policy Config Request. The negotiated MFQ policy applies only to the associated STA that made the policy configuration request and does not apply to any other STA in the BSS.

At some point following acceptance of a policy configuration request, the AP may send a policy stop message to the STA that made the policy configuration request. Alternatively, the STA that made the policy configuration request may send a policy stop message to the AP. As long as no policy stop message has been transmitted by the AP to the STA or by the STA to the AP, the STA may continue to implement the negotiated MFQ policy. However, if the STA determines at 58 that a policy stop message has been received from the AP or transmitted by the STA, the STA may at 60 configure its MAC sublayer module according to the MFQ policy currently advertised by the AP. The AP may have changed its advertised MFQ policy during the time that the STA was configured according to the negotiated MFQ policy. After the STA has at 58 received a policy stop message from the AP or transmitted a policy stop message to the AP, the STA may wait for an advertisement of the MFQ policy currently in effect for the BSS in order to configure its MAC sublayer module in accordance with the current advertised MFQ policy.

Optionally, a policy configuration response received from the AP may indicate that the STA should retry its policy configuration request, as shown at 62. In this case, the policy configuration response may include a suggested MFQ policy (not shown) that the AP might accept upon request. At 64, the STA may transmit another policy configuration request to the AP. This policy configuration request may be the same policy configuration request that was transmitted by the STA at 48, or this policy configuration request may include a MFQ policy element received from the AP describing a suggested MFQ policy (not shown) suggested by the AP, or this policy configuration request may include a different MFQ policy element describing a different MFQ policy than the previously requested MFQ policy. After transmitting the other policy configuration request to the AP at 64, the STA receives a new policy configuration response from the AP at 50.

As an alternative to use of the policy stop message, a STA that no longer wishes to follow the negotiated MFQ policy may send to its associated AP a policy configuration request that includes an MFQ policy element identical to the MFQ policy element advertised by the associated AP. It is expected that the AP will accept a policy configuration request that is requesting the MFQ policy currently implemented in the BSS.

As an alternative to use of the policy stop message, an AP that wants a STA to stop following a negotiated MFQ policy may send to the STA a policy configuration request that includes an MFQ policy element identical to the MFQ policy element advertised by the associated AP. It is expected that the STA will interpret the policy configuration request as a command from the associated AP to stop following the negotiated MFQ policy and to begin following the advertised MFQ policy.

Figure 7:
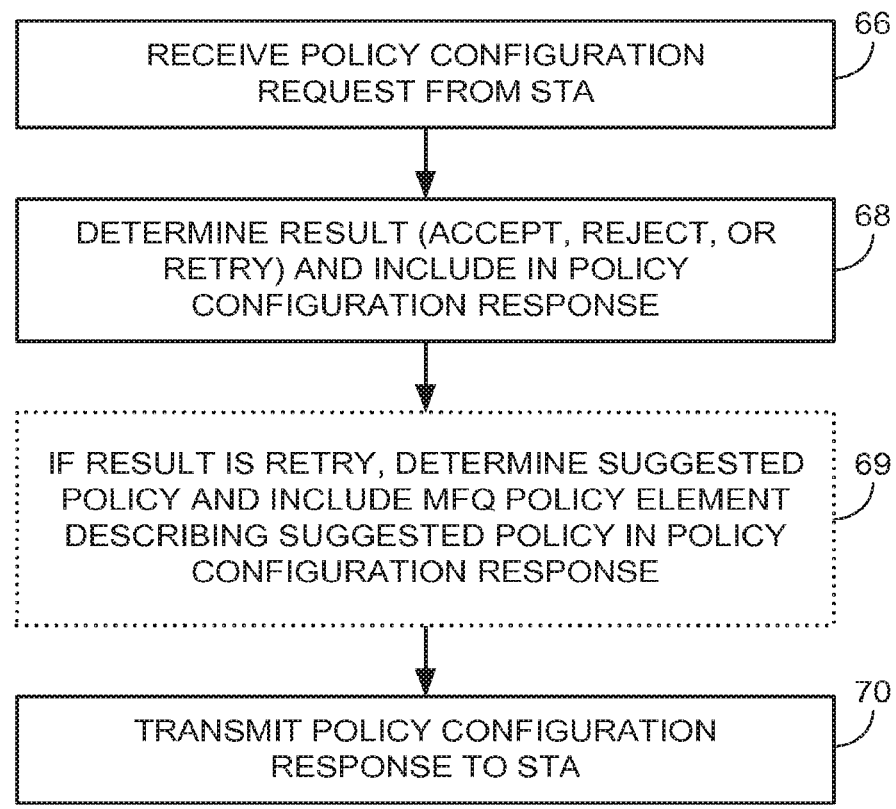
FIG. 7 is an illustration of an example method to be performed by an AP for receiving a policy configuration request from an associated STA for permission to deviate from MFQ information currently advertised by the AP and for responding to the policy configuration request.

FIG. 7 illustrates an example method to be performed by an AP for receiving a policy configuration request from an associated STA for permission to deviate from a MFQ policy currently advertised by the AP and for responding to the request.

The method begins at 66 when the AP receives a policy configuration request from an associated STA. At 68, the AP determines the result of the policy configuration request and includes the result in a policy configuration response to be transmitted to the STA. For example, the AP may determine to accept the policy configuration request or to reject the policy configuration request. Alternatively, the AP may determine that the STA should retry the policy configuration request. In the case that the AP determines that the result of the policy configuration request is retry, the AP may optionally determine at 69 a suggested MFQ policy to include in its policy configuration response to the STA. It is contemplated that such a suggested MFQ policy may be more likely to be accepted by the AP than the requested MFQ policy in the policy configuration request received from the STA at 66.

Following the AP's determination of the result of the policy configuration request at 68 and its optional determination (if the result is retry) of a suggested MFQ policy to describe in a policy configuration response at 69, the AP transmits the policy configuration response to the STA at 70.

Figure 8:
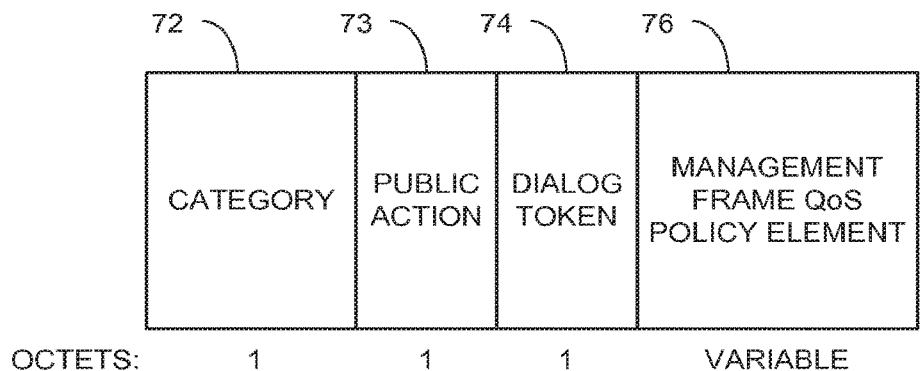
FIG. 8 is an illustration of example formatting for a policy configuration request.

FIG. 8 illustrates example formatting information for a policy configuration request. A policy configuration request may be implemented as a particular type of management frame called an action frame. A Category field 72 which is 1 octet in length is set to a value for public action. A Public Action field 73 which is 1 octet in length is set to indicate a policy configuration request frame. A dialog token field 74 which is 1 octet in length is set by the STA to a value to enable the STA to keep track of its policy configuration requests. A MFQ policy element 76 field describes the particular MFQ policy that is being requested.

Figure 9:
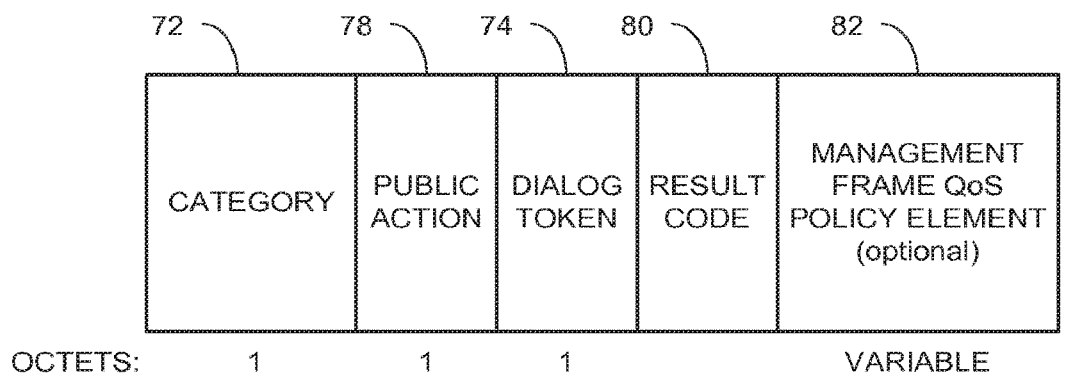
FIG. 9 is an illustration of example formatting for a policy configuration response.

FIG. 9 illustrates example formatting information for a policy configuration response. A policy configuration response may be implemented as an action frame. Category field 72 is as described above for a policy configuration request. A Public Action field 78 which is 1 octet in length is set to indicate a policy configuration response frame. Dialog token field 74 is as described above for a policy configuration request and has the same value that was used to identify the policy configuration request for which this is a response. A Result Code field 80, alternatively named "Status Code" field 80, includes an indication that the AP accepts or rejects the policy configuration request to which the Dialog Token applies or that the STA should retry a request for a policy. An optional MFQ policy element field 82, applicable when the content of the Result Code field 80 comprises an indication that the STA should retry a request, describes how a suggested MFQ policy differs from the default MFQ policy. The STA may request the suggested MFQ policy in place of the originally requested MFQ policy.

Figure 10:
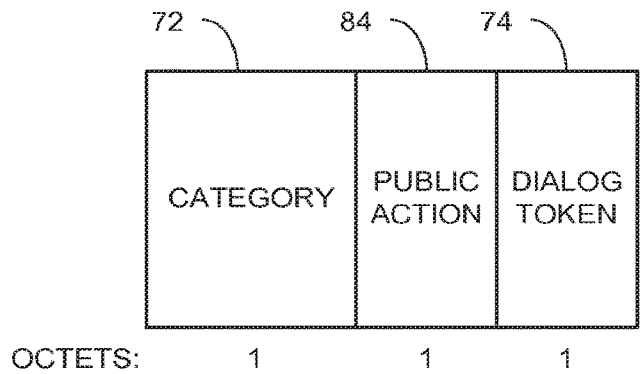
FIG. 10 is an illustration of example formatting for a policy stop message.

FIG. 10 illustrates example formatting information for a policy stop message. A policy stop message may be implemented as an action frame. Category field 72 is as described above for a policy configuration request. A Public Action field 84 which is 1 octet in length is set to indicate a policy stop message. Dialog token field 74 is as described above for a policy configuration request and has the same value that was used to identify the policy configuration request for which this is a policy stop message.

Implementation of MFQ Policy (Default, Advertised or Negotiated)

An AP or non-AP STA may configure its MAC sublayer module to implement an MFQ policy. The MFQ policy being implemented by the MAC sublayer module may be the default MFQ policy. Alternatively, the MFQ policy being implemented by the MAC sublayer module may be the default MFQ modified by an advertised MFQ policy element. Alternatively, the MFQ policy being implemented by the MAC sublayer module may be the default MFQ policy modified by a MFQ policy element in a policy configuration request that has been accepted. While a management frame is generated within the MAC sublayer module, the management frame will be assigned to an access category as defined by the MFQ policy, and subsequently transmitted, using the respective access category. In the present implementation, the management frame is directed, based on its assigned access category, to one of four EDCA prioritized queues where each of the prioritized queues is associated with a respective access category. As such, in the present implementation, a management frame assigned to AC_VO will be transmitted using a prioritization (i.e., a transmission priority) associated with AC_VO, a management frame assigned to AC_VI will be transmitted using a prioritization associated with AC_VI, a management frame assigned to AC_BE will be transmitted using a prioritization associated with AC_BE, and a management frame assigned to AC_BK will be transmitted using a prioritization associated with AC_BK. In other words, each access category (e.g., AC_VO, AC_VI, AC_BE and AC_BK) is indicative of a distinct prioritization (i.e., transmission priority) used to transmit a particular type or subtype of management frame. Handling of the contents of the prioritized queues may follow IEEE 802.11 scheduling and transmission rules. For example, a frame scheduler schedules frames from the prioritized queues to be passed to the physical (PHY) sublayer module for transmission over a channel of a wireless medium.

Figure 11:
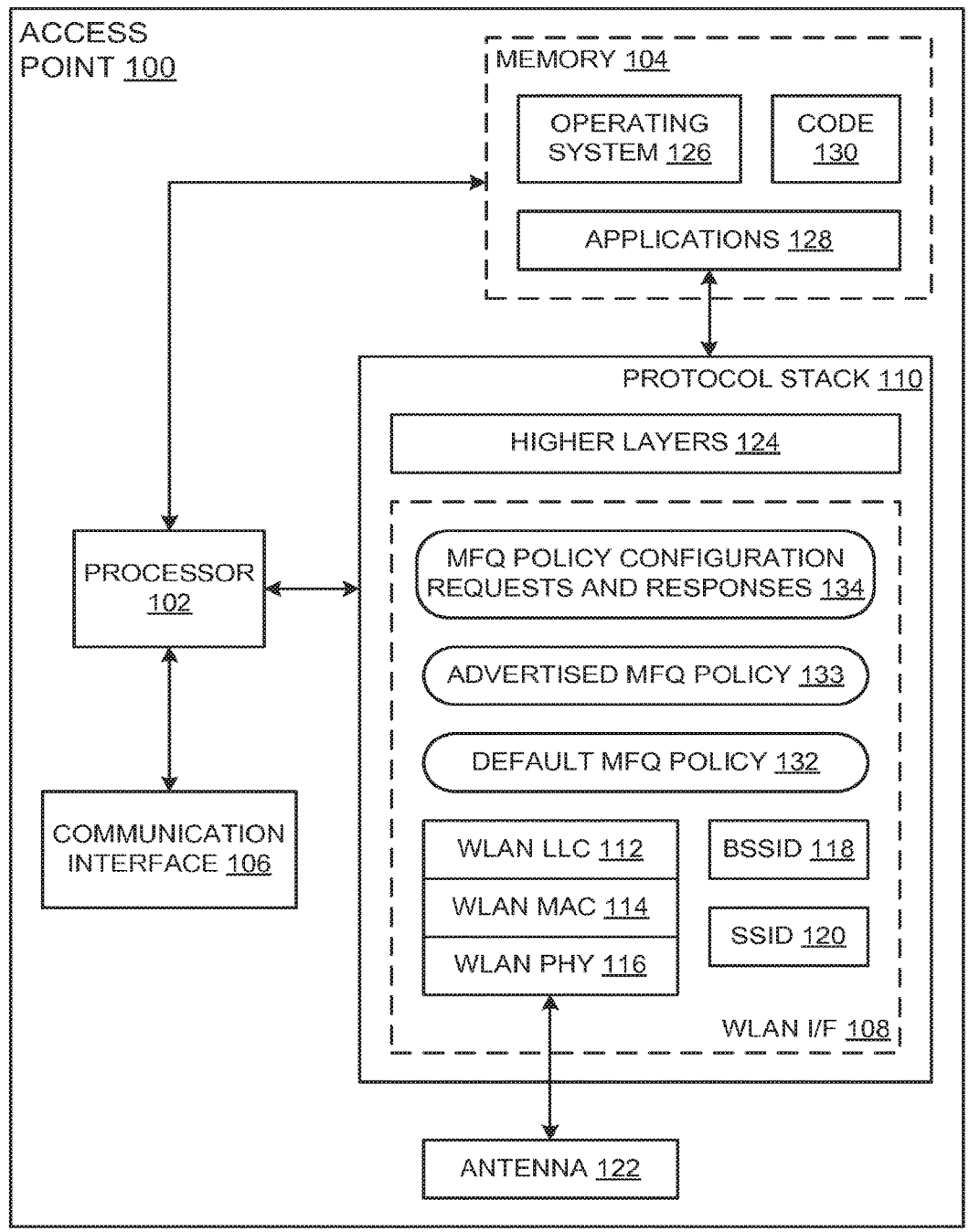
FIG. 11 is a block diagram of an example AP.

FIG. 11 is a block diagram of an example AP 100. AP 10 is an example of AP 100. AP 100 comprises a processor 102 coupled to a memory 104 and to a communication interface 106. Communication interface 106 may be a wired communication interface, a satellite interface, a Worldwide Interoperability for Microwave Access (WiMAX®) communication interface, or any other suitable communication interface. AP 100 also comprises a WLAN interface 108 within a protocol stack 110 that is coupled to processor 102. WLAN interface 108 comprises a logical link control (LLC) sublayer module 112, a MAC sublayer module 114 and a PHY sublayer module 116. The BSSID of AP 100 is stored in WLAN interface 108, possibly in a register 118. The SSID of the WLAN supported by AP 100 is stored in WLAN interface 108, possibly in a register 120. MAC sublayer module 114 may be compatible with IEEE 802.11. AP 100 also comprises an antenna 122 coupled to PHY sublayer module 116. Protocol stack 110 may comprise higher layers 124. ANQP support may be implemented in MAC sublayer module 114.

Memory 104 may store an operating system 126 to be executed by processor 102. Memory 104 may store applications 128 installed in AP 100 to be executed by processor 102. Examples of applications 128 include a configuration application that enables a WLAN administrator to configure parameters of the WLAN, for example, its SSID and BSSID(s). Memory 104 may store code 130 which, when executed by processor 102, results in one or more of the methods illustrated in FIGS. 2, 3, and 7.

A default MFQ policy 132 is not advertised in the BSS. Depending upon implementation, default MFQ policy 132 may be stored in WLAN interface 108 (as illustrated) or in memory 104. Depending upon implementation, an advertised MFQ policy 133 currently implemented by WLAN MAC sublayer 114 may be stored in WLAN interface 108 (as illustrated) or in memory 104. AP 100 is able to advertise how advertised MFQ policy 133 differs from default MFQ policy 132. AP 100 may optionally store data 134 related to one or more policy configuration requests that have previously been received from one or more associated STAs and related to one or more policy configuration responses that have previously been transmitted to one or more associated STAs. Data 134 may be implemented, for example, as records in a table, where the records are maintained on a per-AID (association identifier) basis. Depending upon implementation, data 134 may be stored in WLAN interface 108 (as illustrated) or in memory 104.

AP 100 may comprise other elements that, for clarity, are not illustrated in FIG. 11. Similarly, AP 100 may comprise a subset of the elements illustrated in FIG. 11.

Figure 12:
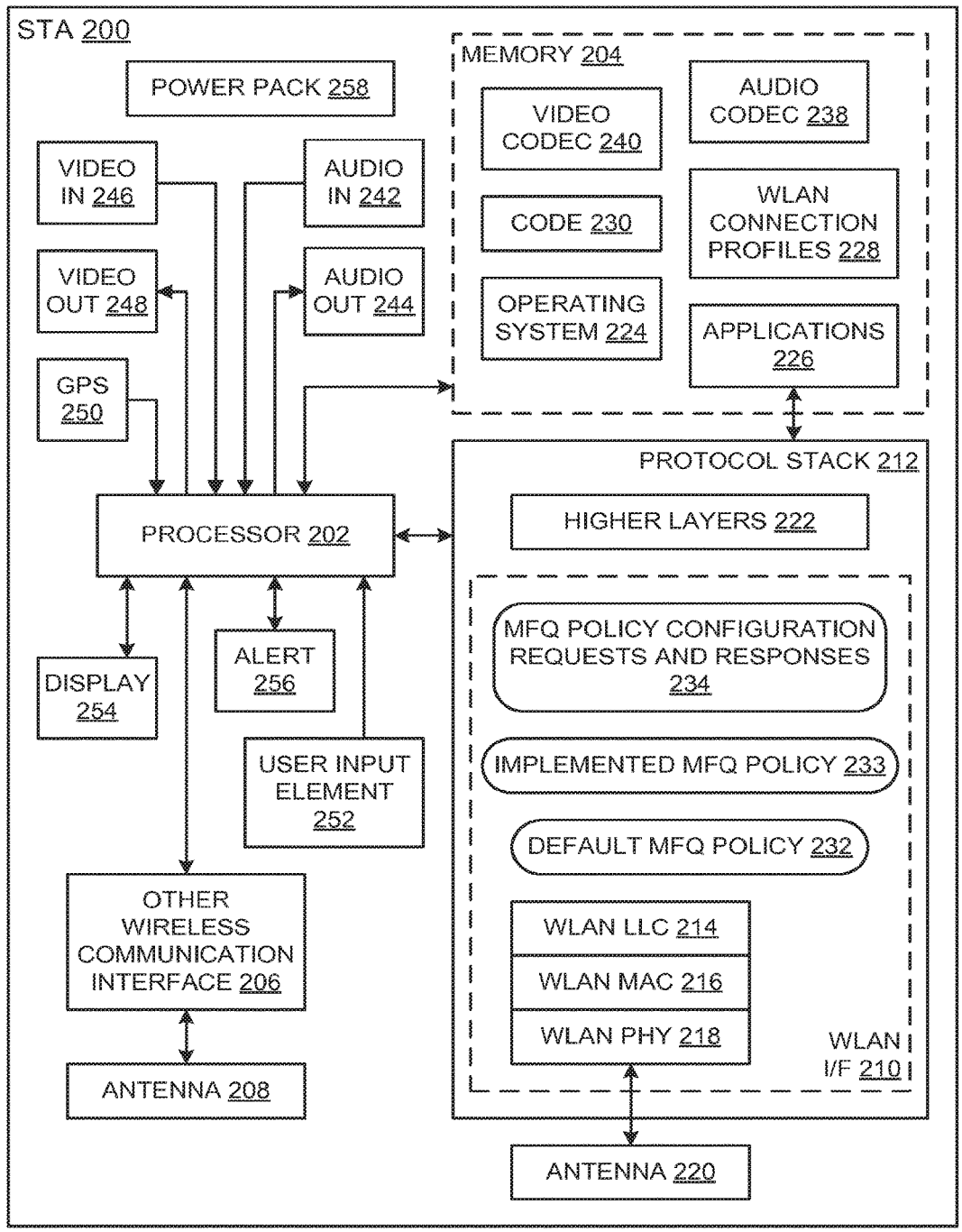
FIG. 12 is a block diagram of an example STA.

FIG. 12 is a block diagram of an example STA, for example, any one of STAs 14. An STA 200 comprises a processor 202 coupled to a memory 204 and optionally to one or more other wireless communication interfaces 206. For example, wireless communication interfaces 206 may comprise a short-range wireless communication interface such as a wireless personal area network interface, possibly compatible with the Bluetooth Specification Version 4.0 published 30 Jun. 2010 or its official successors. In another example, wireless communication interfaces 206 may comprise a wireless wide area network (WWAN) interface such as for cellular communications. One or more antennas 208 may be coupled to respective ones of the wireless communication interfaces 206. An antenna may be shared among more than one wireless interface.

STA 200 also comprises a WLAN interface 210 within a protocol stack 212 that is coupled to processor 202. WLAN interface 210 comprises a LLC sublayer module 214, a MAC sublayer module 216 and a PHY sublayer module 218. MAC sublayer module 216 may be compatible with IEEE 802.11. STA 200 also comprises an antenna 220 coupled to PHY sublayer module 218. Protocol stack 212 may comprise higher layers 222.

Memory 204 may store an operating system 224 to be executed by processor 202. Memory 204 may store applications 226 installed in STA 200 to be executed by processor 202. For example, applications 226 may comprise a control application to act on MFQ policy elements received from an AP. In a further example, applications 226 may comprise a Voice over Internet Protocol (VoIP) application. In yet another example, applications 226 may comprise a telephony application. Memory 204 may also store data (not shown) used by operating system 224 and applications 226.

Memory 204 may store one or more WLAN connection profiles 228, each identifying a wireless local area network by its SSID, as known in the art.

Memory 204 may store code 230 which, when executed by processor 202, results in one or more of the methods illustrated in FIGS. 4 and 6. Receipt of a downlink frame and handling of MFQ information describing an advertised MFQ policy may be implemented in MAC sublayer module 216. ANQP support may be implemented in MAC sublayer module 216.

A default MFQ policy 232 is not advertised in the BSS. Depending upon implementation, default MFQ policy 232 may be stored in WLAN interface 210 (as illustrated) or in memory 204. Depending upon implementation, a MFQ policy 233 currently implemented by WLAN MAC sublayer 216 may be stored in WLAN interface 210 (as illustrated) or in memory 204. STA 200 may optionally store data 234 related to one or more policy configuration requests made by the STA and related to one or more policy configuration responses received by the STA. STA 200 may store an indication of its requested MFQ policy and then overwrite currently implemented MFQ policy 233 with the negotiated MFQ policy upon receiving acceptance of the policy configuration request.

Memory 204 may store an audio coder-decoder (codec) 238 or a video codec 240 or both. STA 200 may comprise an audio input element 242 and an audio output element 244, both coupled to processor 202. STA 200 may comprise a video input element 246 and a video output element 248, both coupled to processor 202.

STA 200 may comprise a Global Positioning System (GPS) module 250 coupled to processor 202.

STA 200 may comprise one or more user input elements 252 coupled to processor 202. Examples of user input elements include a keyboard, a keypad, a touchscreen, a joystick, a thumbwheel, a roller, a touchpad, a trackpad, a capacitive touch pad, an optical touch pad, and any other type of navigation actuator.

STA 200 may comprise one or more user output elements coupled to processor 202, of which a display 254 is illustrated. In the event that display 254 is a touchscreen, it functions also as a user input element.

STA 200 may comprise one or more alert components 256 coupled to processor 202, to be activated in order to alert a user, for example, by sounding a buzzer, playing a ringtone, emanating light, or vibrating.

STA 200 may include mechanical interfaces, such as a power connector jack, a data interface port such as a Universal Serial Bus (USB) port, a headphone jack, and other mechanical interfaces that are not explicitly shown.

STA 200 comprises a power pack 258 that provides power to the other components of STA 200.

STA 200 may comprise other elements that, for clarity, are not illustrated in FIG. 12. Similarly, STA 200 may comprise a subset of the elements illustrated in FIG. 12.

Figure 13:
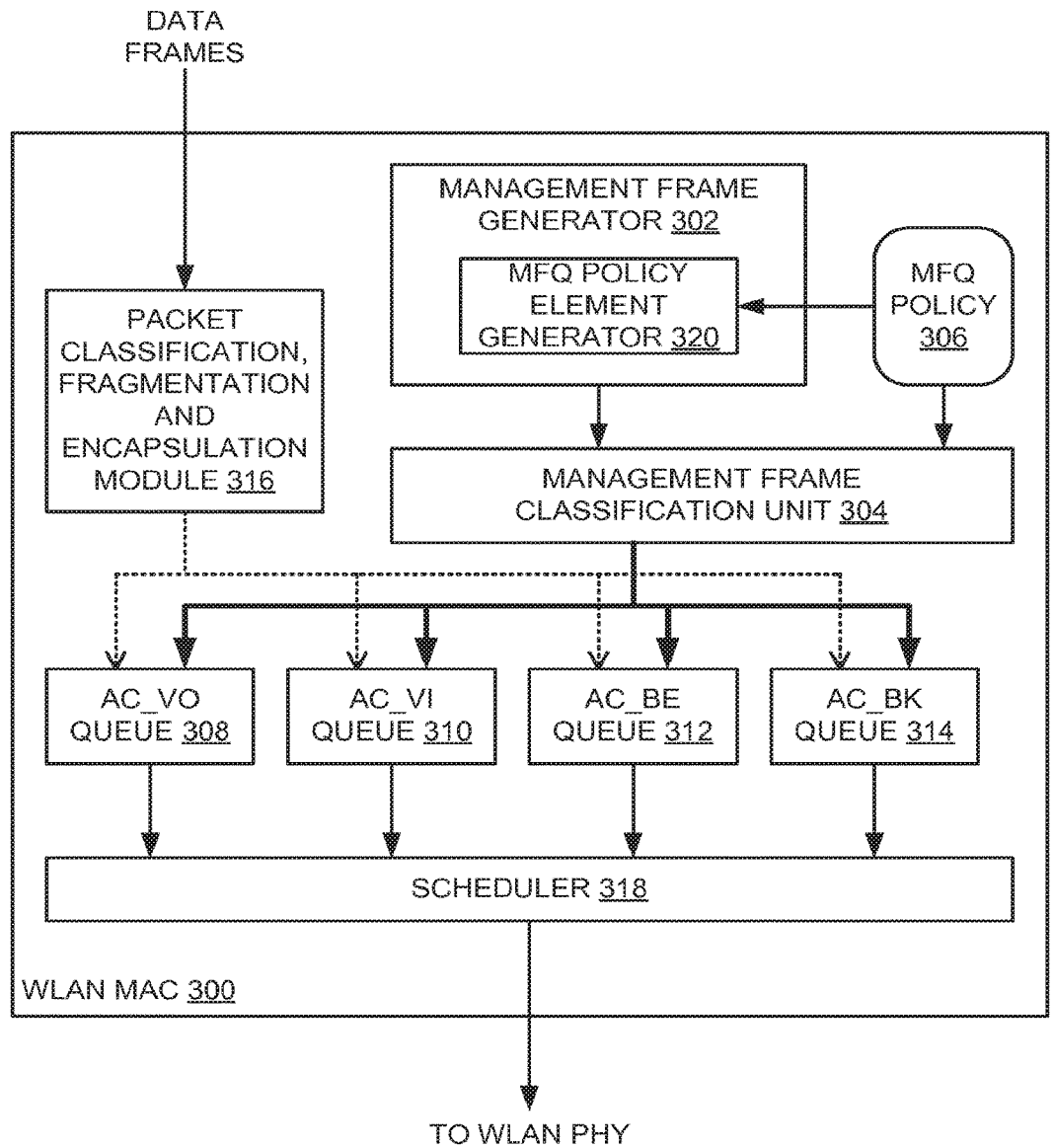
FIG. 13 is a block diagram of a media access control (MAC) sublayer module of an AP.

FIG. 13 is a block diagram of a MAC sublayer module 300 of an AP, for example, MAC sublayer module 114 of AP 100. MAC sublayer module 300 uses a management frame generator 302 to generate management frames which are distributed to different memory queues by a management frame classification unit 304. Distribution to the different memory queues is done according to a MFQ policy 306 currently implemented in the BSS to which the AP belongs.

Management frames of the type or types for which MFQ policy 306 defines the access category AC_VO are routed by management frame classification unit 304 through memory queue 308. Management frames of the type or types for which MFQ policy 306 defines the access category AC_VI are routed by management frame classification unit 304 through memory queue 310. Management frames of the type or types for which MFQ policy 306 defines the access category AC_BE are routed by management frame classification unit 304 through memory queue 312. Management frames of the type or types for which MFQ policy 306 defines the access category AC_BK are routed by management frame classification unit 304 through memory queue 314. In some implementations, MFQ policy 306 defines an access category other than the AC_VO access category associated with the highest priority queue 308 for at least one management frame type.

Data frames (content frames and signaling frames) received at MAC sublayer module 300 from an LLC sublayer module (not shown) of the AP, for example, LLC sublayer module 112, may be processed by a packet classification, fragmentation and encapsulation module 316 in MAC sublayer module 300 and then subsequently routed through the same memory queues as the management frames.

A scheduler 318 schedules frames from memory queues 308, 310, 312 and 314 to be passed to a PHY sublayer module of the AP, for example, PHY sublayer module 116. For example, IEEE 802.11e has separate minimum and maximum values for each access category. Within each access category, a random number is generated that represents a wait time as multiplied by a "slot time". In IEEE 802.11a/g, a slot time is 9 microseconds. Once the wireless medium is quiet or unoccupied, a countdown begins before transmission. Each count is 9 microseconds in real time. For AC_VO queue 308, the countdown begins at a value between 31 and 127. For AC_VI queue 310, the countdown begins at a value between 127 and 255. For AC_BE queue 312, the countdown begins at a value between 255 and 511. For AC_BK queue 314, the countdown begins at a value between 511 and 1023. If the countdown is interrupted, it is paused until the wireless medium is once again quiet, and is then resumed from the value at which it was paused. If the countdowns for different queues begin at the same time, traffic in a higher priority queue will gain access to the wireless medium ahead of traffic in a lower priority queue.

MAC sublayer module 300 further comprises a MFQ policy element generator 320 which generates a MFQ policy element based on MFQ policy 306. As described previously, a MFQ policy element may be included in certain management frames generated by management frame generator 302 to advertise an advertised MFQ policy. For example, a MFQ policy element generated by MFQ policy element generator 320 may be included in a downlink frame such as a beacon frame or a probe response frame that is generated by management frame generator 302. It should be noted that, while not explicitly shown, MAC sublayer module 300 may also implement ANQP support.

Figure 14:
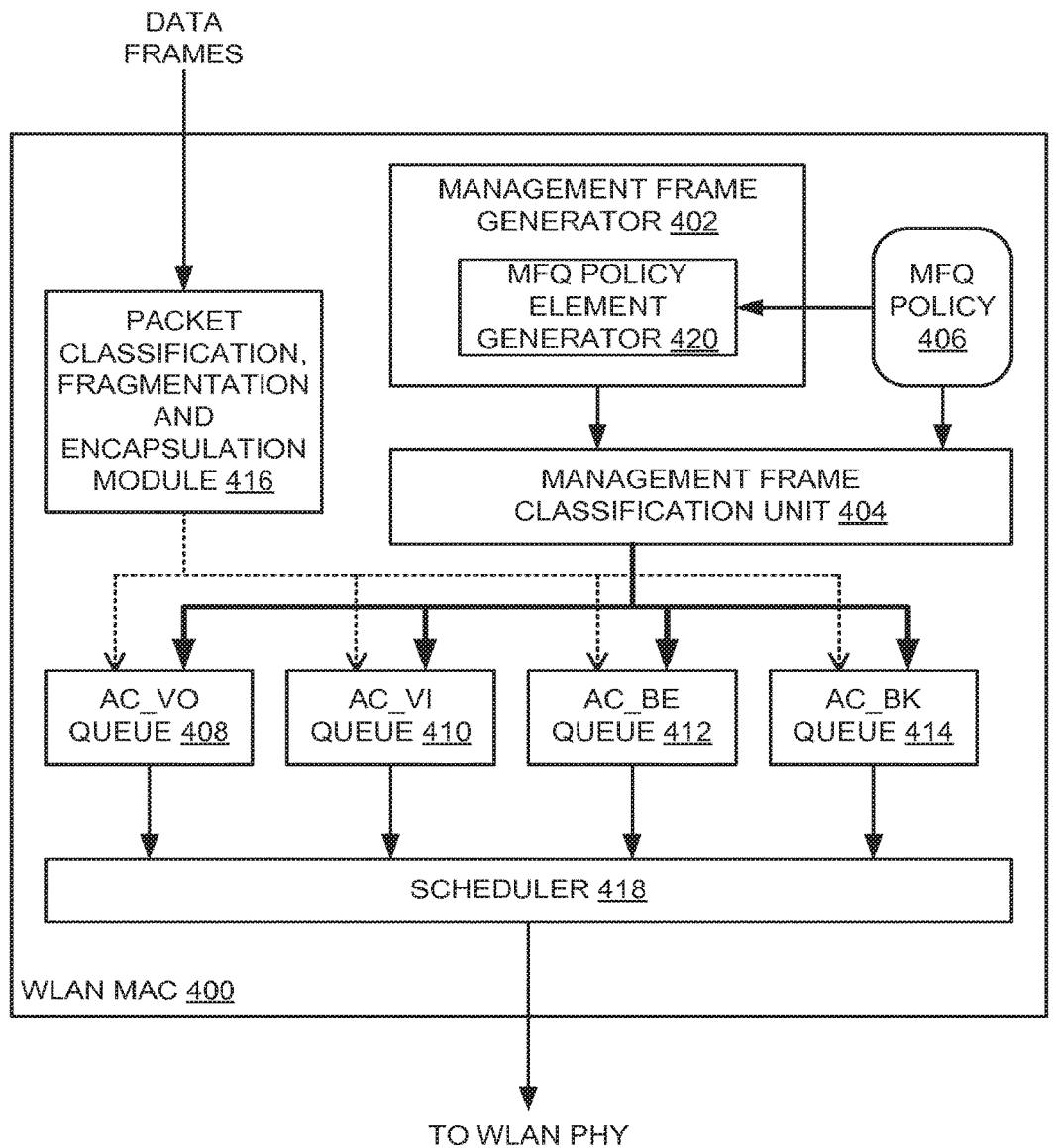
FIG. 14 is a block diagram of a MAC sublayer module of a STA.

FIG. 14 is a block diagram of a MAC sublayer module 400 of a STA, for example, MAC sublayer module 216 of STA 200. MAC sublayer module 400 uses a management frame generator 402 to generate management frames which are distributed to different memory queues by a management frame classification unit 404. Distribution to the different memory queues is done according to a MFQ policy 406. Management frames of the type or types for which MFQ policy 406 defines the access category AC_VO are routed by management frame classification unit 404 through memory queue 408. Management frames of the type or types for which MFQ policy 406 defines the access category AC_VI are routed by management frame classification unit 404 through memory queue 410. Management frames of the type or types for which MFQ policy 406 defines the access category AC_BE are routed by management frame classification unit 404 through memory queue 412. Management frames of the type or types for which MFQ policy 406 defines the access category AC_BK are routed by management frame classification unit 404 through memory queue 414. In some implementations, MFQ policy 406 defines an access category other than the AC_VO access category associated with the highest priority queue 408 for at least one management frame type.

It is contemplated that MFQ policy 406 is an advertised MFQ policy. It is also contemplated that MFQ policy 406 is a negotiated MFQ policy accepted by an AP with which the STA is associated. It is also contemplated that MFQ policy 406 is the default MFQ policy.

Data frames (content frames and signaling frames) received at MAC sublayer module 400 from an LLC sublayer module (not shown) of the STA, for example, LLC sublayer module 214, may be processed by a packet classification, fragmentation and encapsulation module 416 in MAC sublayer module 400 and then subsequently routed through the same memory queues as the management frames.

A scheduler 418 schedules frames from memory queues 408, 410, 412 and 414 to be passed to a PHY sublayer module of the STA, for example, PHY sublayer module 218. For example, IEEE 802.11e has separate minimum and maximum values for each access category. Within each access category, a random number is generated that represents a wait time as multiplied by a "slot time". In IEEE 802.11a/g, a slot time is 9 microseconds. Once the wireless medium is quiet or unoccupied, a countdown begins before transmission. Each count is 9 microseconds in real time. For AC_VO queue 408, the countdown begins at a value between 31 and 127. For AC_VI queue 410, the countdown begins at a value between 127 and 255. For AC_BE queue 412, the countdown begins at a value between 255 and 511. For AC_BK queue 414, the countdown begins at a value between 511 and 1023. If the countdown is interrupted, it is paused until the wireless medium is once again quiet, and is then resumed from the value at which it was paused. If the countdowns for different queues begin at the same time, traffic in a higher priority queue will gain access to the wireless medium ahead of traffic in a lower priority queue.

MAC sublayer module 400 further comprises a MFQ policy element generator 420 which generates a MFQ policy element based on a requested MFQ policy. As described previously, the MFQ policy element may be included in a policy configuration request generated by management frame generator 402 to negotiate a deviation from an advertised MFQ policy. It should be noted that, while not explicitly shown, MAC sublayer module 400 may also implement ANQP support.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for a wireless station, the method comprising:
transmitting, to an access point, a management frame quality of service (MFQ) policy configuration request requesting a change in a MFQ policy, wherein the MFQ policy configuration request includes a first dialog token having a length of 8 bits and wherein the first dialog token is set to a first value by the wireless station;
receiving, from the access point, a MFQ policy configuration response, wherein the MFQ policy configuration response includes a MFQ policy element and a second dialog token having a length of 8 bits; and
transmitting any subsequent management frames to the access point in accordance with changes to the MFQ policy when the second dialog token is the same as the first dialog token.

2. The method as claimed in claim 1, wherein the MFQ policy configuration request includes a MFQ policy element indicative of the requested change.

3. The method as claimed in claim 1, wherein the MFQ policy configuration response is received in response to the MFQ policy configuration request.

4. The method as claimed in claim 3, wherein the MFQ policy configuration response includes a status code indicating whether the access point has accepted or rejected the change in the MFQ policy.

5. The method as claimed in claim 1, wherein the wireless station sets the first dialog token to the first value to keep track of the MFQ policy configuration request.

6. A method for an access point, the method comprising:
receiving, from a wireless station, a management frame quality of service (MFQ) policy configuration request requesting a change in a MFQ policy, wherein the MFQ policy configuration request includes a first dialog token having a length of 8 bits and wherein the first dialog token is set to a first value by the wireless station;
transmitting, by the access point, a MFQ policy configuration response, wherein the MFQ policy configuration response includes a MFQ policy element and a second dialog token having a length of 8 bits; and
receiving any subsequent management frames transmitted from the wireless station in accordance to the change in the MFQ policy when the second dialog token is the same as the first dialog token.

7. The method as claimed in claim 6, wherein the MFQ policy configuration request includes a MFQ policy element indicative of the requested change.

8. The method as claimed in claim 6, wherein the MFQ policy configuration response is transmitted in response to the MFQ policy configuration request.

9. The method as claimed in claim 8, wherein the MFQ policy configuration response includes a status code indicating whether the access point has accepted or rejected the change in the MFQ policy.

10. The method as claimed in claim 6, wherein the wireless station sets the first dialog token to the first value to keep track of the MFQ policy configuration request.

11. A wireless station comprising:
a processor configured to:
transmit, to an access point, a management frame quality of service (MFQ) policy configuration request requesting a change in a MFQ policy, wherein the MFQ policy configuration request includes a first dialog token having a length of 8 bits and wherein the first dialog token is set to a first value by the wireless station;
receive, from the access point, a MFQ policy configuration response, wherein the MFQ policy configuration response includes a MFQ policy element and a second dialog token having a length of 8 bits; and
transmit any subsequent management frames to the access point in accordance with changes to the MFQ policy when the second dialog token is the same as the first dialog token.

12. The wireless station as claimed in claim 11, wherein the MFQ policy configuration request includes a MFQ policy element indicative of the requested change.

13. The wireless station as claimed in claim 11, wherein the MFQ policy configuration response is received in response to the MFQ policy configuration request.

14. The wireless station as claimed in claim 13, wherein the MFQ policy configuration response includes a status code indicating whether the access point has accepted or rejected the change in the MFQ policy.

15. The wireless station as claimed in claim 11, wherein the wireless station sets the first dialog token to the first value to keep track of the MFQ policy configuration request.

16. An access point comprising:
a processor configured to:
receive, from a wireless station, a management frame quality of service (MFQ) policy configuration request requesting a change in a MFQ policy, wherein the MFQ policy configuration request includes a first dialog token having a length of 8 bits and wherein the first dialog token is set to a first value by the wireless station;
transmit, by the access point, a MFQ policy configuration response, wherein the MFQ policy configuration response includes a MFQ policy element and a second dialog token having a length of 8 bits; and
receive any subsequent management frames transmitted from the wireless station in accordance to the change in the MFQ policy when the second dialog token is the same as the first dialog token.

17. The access point as claimed in claim 16, wherein the MFQ policy configuration request includes a MFQ policy element indicative of the requested change.

18. The access point as claimed in claim 16, wherein the MFQ policy configuration response is transmitted in response to the MFQ policy configuration request.

19. The access point as claimed in claim 18, wherein the MFQ policy configuration response includes a status code indicating whether the access point has accepted or rejected the change in the MFQ policy.

20. The access point as claimed in claim 16, wherein the wireless station sets the first dialog token to the first value to keep track of the MFQ policy configuration request.

* * * * *